United States Patent
Mepham et al.

(10) Patent No.: US 8,523,734 B2
(45) Date of Patent: Sep. 3, 2013

(54) MULTI-MODE HYBRID TRANSMISSION

(75) Inventors: Shaun E. Mepham, Saline, MI (US);
Jonathan P. Brentnall, Ortonville, MI (US); Cameron P. Williams, Dexter, MI (US); Eric Sharkness, Canton, MI (US); Felipe V. Brandao, Saline, MI (US)

(73) Assignee: Ricardo, Inc., Van Buren Township, MI (US)

( * ) Notice: Subject to any disclaimer, the term of this patent is extended or adjusted under 35 U.S.C. 154(b) by 739 days.

(21) Appl. No.: 12/613,992

(22) Filed: Nov. 6, 2009

(65) Prior Publication Data
US 2010/0120580 A1 May 13, 2010

Related U.S. Application Data

(60) Provisional application No. 61/112,234, filed on Nov. 7, 2008.

(51) Int. Cl.
*F16H 3/72* (2006.01)
*F16H 37/06* (2006.01)
*B60W 10/02* (2006.01)
*B60W 10/08* (2006.01)

(52) U.S. Cl.
USPC ........ 477/3; 477/5; 475/5; 74/325; 180/65.21

(58) Field of Classification Search
USPC ................ 74/325, 340; 477/3; 180/65.21
See application file for complete search history.

(56) References Cited

U.S. PATENT DOCUMENTS

| 6,499,370 B2 | 12/2002 | Bowen |
| 6,558,283 B1 | 5/2003 | Schnelle |
| 6,695,082 B2 * | 2/2004 | Bitsche et al. ............. 180/65.25 |
| 6,811,508 B2 | 11/2004 | Tumback |
| 6,837,816 B2 | 1/2005 | Tsai et al. |
| 6,958,027 B2 * | 10/2005 | Shimizu et al. ................... 475/5 |

(Continued)

FOREIGN PATENT DOCUMENTS

| DE | 10143289 | 3/2003 |
| EP | 1013494 | 6/2000 |
| WO | 2007000848 | 1/2007 |

OTHER PUBLICATIONS

International Search Report, PCT/US2009/063572, Jun. 11, 2009.
Written Opinion, PCT/US2009/063572, Jun. 11, 2009.

*Primary Examiner* — David D Le
*Assistant Examiner* — Colby M Hansen
(74) *Attorney, Agent, or Firm* — Warner Norcross & Judd LLP

(57) ABSTRACT

A multi-mode hybrid transmission for transmitting power from a prime mover and a stored source of energy to a final drive shaft. The transmission may include an input shaft to receive torque from the prime mover, a countershaft operatively coupled to the final drive shaft, a plurality of gear pairs each defining a torque path from the input shaft to the countershaft, a synchromesh clutch assembly to selectively couple the input shaft with a desired gear pair, and first and second electric machines rotatably carried by the input shaft. The first electric machine can provide a motive force to the final drive shaft and the second electric machine can covert rotary speed of the input shaft into electrical energy. Additionally, the first and second electric machines can provide supplemental torque to the output shaft during periods of reduced torque from the prime mover associated with a change in torque path.

34 Claims, 11 Drawing Sheets

(56) References Cited

U.S. PATENT DOCUMENTS

| | | | |
|---|---|---|---|
| 7,090,607 B2* | 8/2006 | Yamauchi et al. | 475/5 |
| 7,125,362 B2* | 10/2006 | Beaty et al. | 477/3 |
| 7,207,915 B2* | 4/2007 | Oshidari et al. | 475/5 |
| 7,479,081 B2* | 1/2009 | Holmes | 475/5 |
| 8,231,491 B2* | 7/2012 | Oba et al. | 475/5 |

* cited by examiner

MULTI-MODE HYBRID TRANSMISSION

This application claims priority from provisional U.S. Application No. 61/112,234 filed Nov. 7, 2008, and entitled "Three Speed Dual Motor/Generator Transaxle."

BACKGROUND OF THE INVENTION

The present invention relates to vehicle transmissions. More particularly, the present invention relates to a hybrid transmission capable of receiving power from both a prime mover and a source of stored energy.

Previously, hybrid transmissions used epicyclic gearing to provide power from an internal combustion engine, a motor, or both, and relied on conventional automatic transmission technology such as wet clutches and torque converters to transition between drive ratios. These systems were found to provide only a limited number of available operating modes, and included unacceptable inefficiencies and sheer losses.

Attempts have been made to provide an improved hybrid transmission with a wide range of operating modes, but with limited success. For example, U.S. Pat. No. 6,837,816 to Tsai et al discloses an example of a known hybrid transmission including an epicyclic gearing assembly mounted coaxially with a single motor/generator. This configuration allows the motor/generator to supplement the torque supplied by an internal combustion engine, but fails to include a series hybrid mode of operation to simultaneously charge an energy storage device while providing a motive force from the single motor/generator. Similarly, U.S. Pat. No. 6,499,370 to Bowen discloses an automatic transmission including a manually-shifted synchromesh and two motor/generators disposed along first and second concentric input shafts. This configuration allows a motor/generator to supplement the torque supplied by an internal combustion engine, but also fails to include a series hybrid mode of operation. Likewise, U.S. Pat. No. 6,811,508 to Tumback discloses a known hybrid transmission including an epicyclic gearing assembly and two motor/generators carried on lay shafts in parallel alignment with the input shaft. This configuration allows both motor/generators to supplement the torque supplied by an internal combustion engine, but fails to include a mode of operation where a first motor/generator supplies a motive force while the internal combustion engine supplies power directed to the electric motor or charges an electrical energy storage device when the state of the charge falls below a predetermined level.

Therefore, there remains a need for an improved hybrid transmission that provides a wide range of mechanical ratios and can leverage the benefits of a hybrid vehicle. There also remains a need to provide an improved hybrid transmission suitable for operation in mechanical, parallel hybrid, series hybrid, and electrical power modes and having regenerative breaking and launch assist capabilities.

SUMMARY OF THE INVENTION

The present invention provides a multi-mode hybrid transmission capable of providing a wide range of mechanical ratios and multiple modes of operation. The transmission generally includes an input shaft to receive torque from a prime mover, a counter shaft operatively connected to a final drive shaft, a plurality of gear pairs each defining a torque path, a synchromesh clutch assembly to selectively engage a desired gear pair, and first and second electric machines each including a rotor carried by the input shaft, wherein the first and second electric machines are operable to independently and collectively provide supplemental torque to the countershaft during periods of reduced torque from the prime mover associated with a change in the torque path.

In one embodiment, the input shaft and the countershaft are in parallel alignment. Each of the plurality of gear pairs includes an input gear carried by the input shaft intermeshed with an output gear carried by the countershaft, where the gears carried by the input shaft transmits torque to each gear with which it meshes. A shift fork moveable parallel to the input shaft brings the synchromesh clutch assembly into engagement with the input desired gear to achieve a particular torque path.

In one embodiment, the transmission includes a plurality of speed sensors to detect the rotational speed of the input shaft, the output shaft, and the first and second electric machines. The transmission may also include a plurality of position sensors to detect the position of each of the plurality of synchromesh clutch assemblies. A transmission controller is operatively connected to the plurality of speed sensors and the plurality of position sensors and is adapted to vary the speed of the first and second electric machines and to control operation of the first and second synchromesh clutch assemblies to achieve a desired power output and a desired torque path.

In one embodiment, the transmission includes an input shaft to receive power from a prime mover, a counter shaft operatively connected to a final driveshaft, an first intermeshed gear pair, a second intermeshed gear pair, first and second clutch assemblies, and first and second electric machines each including a rotor carried by the input shaft, wherein the prime mover and first and second electric machines are operable to independently and cooperatively drive the final drive shaft. The output gears for the first and second gear pairs can be fixedly attached to each other to rotate in fixed relation about a common axis. Additionally, the transmission may include a first sub-shaft to connect the rotor for the second electric machine with the input gear for the first gear pair, where the first sub-shaft concentrically encompasses at least a portion of the input shaft. A second sub-shaft can concentrically encompass at least portion of the first sub-shaft, where the rotor for the first electric machine extends radially from the second sub-shaft. A third gear pair can define a torque path from the first electric machine to the countershaft and may include an input gear extending radially from the second sub-shaft and an output gear carried by the countershaft.

In another embodiment, the transmission may include an output shaft disposed adjacent to the input shaft in parallel alignment with the countershaft. A fourth gear pairing can define a torque path from the countershaft to the output shaft including an input gear carried by the countershaft and an output gear carried by the output shaft. A clutch assembly positioned in a power flow path between the first electric machine and the final drive shaft can selectively disengage the first electric machine from the final drive shaft, wherein the first and second electric machines can be simultaneously drivable by the input shaft to convert power from the prime mover into electrical energy when the host vehicle is stationary, for example. In operation, the first electric machine can provide a motive force to the final drive shaft and the second electric machine can simultaneously to the convert rotary speed of the input shaft into electrical energy. Additionally, the first and second machines can independently and cooperatively provide torque to the input shaft to start the prime mover from a condition of rest. The transmission can optionally include a controller to control actuation of the first and second electric machines in mechanical power mode, electric power mode, parallel hybrid mode, and series hybrid mode.

These and other features and advantages of the present invention will become apparent from the following description of the invention, when viewed in accordance with the accompanying drawings and appended claims.

DETAILED DESCRIPTION OF THE CURRENT EMBODIMENT

I. First Embodiment

Figure 1A:
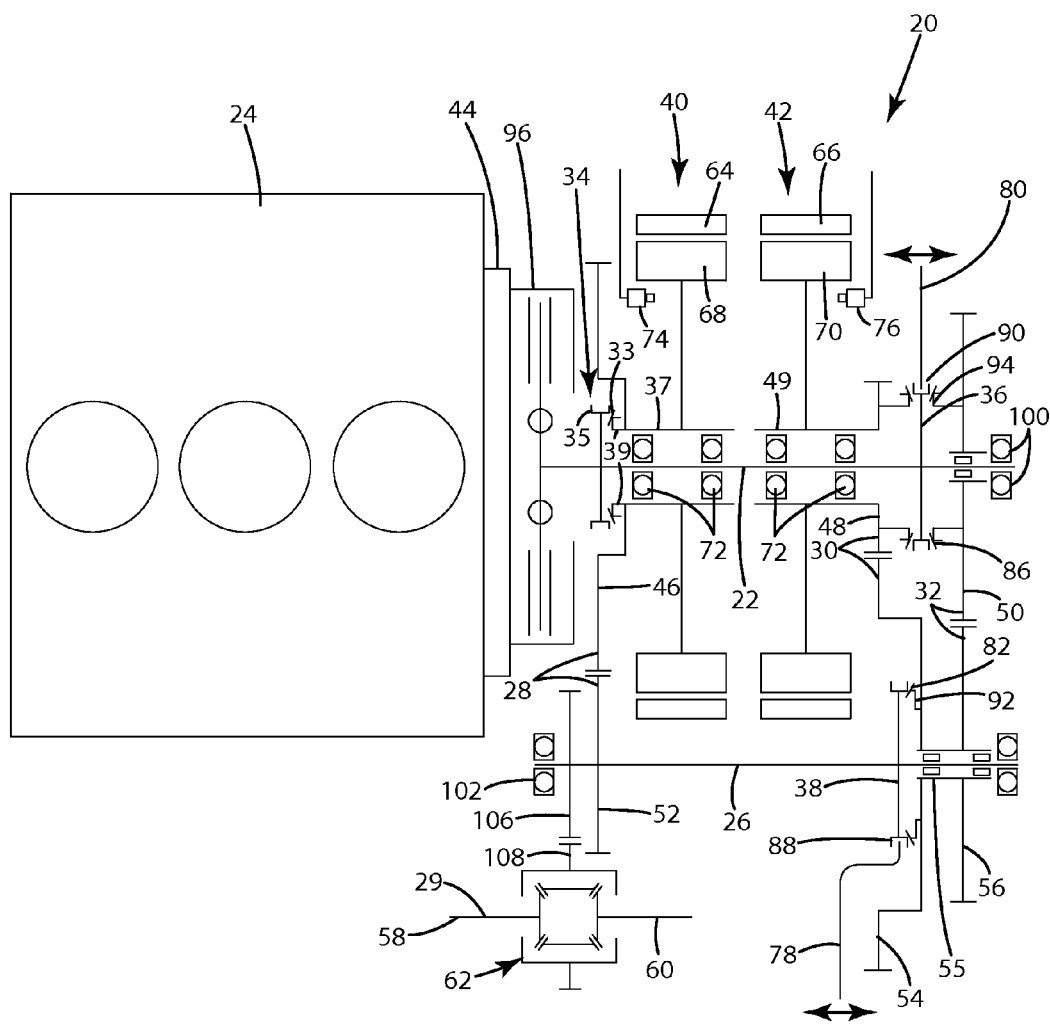
FIG. 1A is a schematic representation of a three-speed hybrid transmission in accordance with an embodiment of the present invention.
Figure 1B:
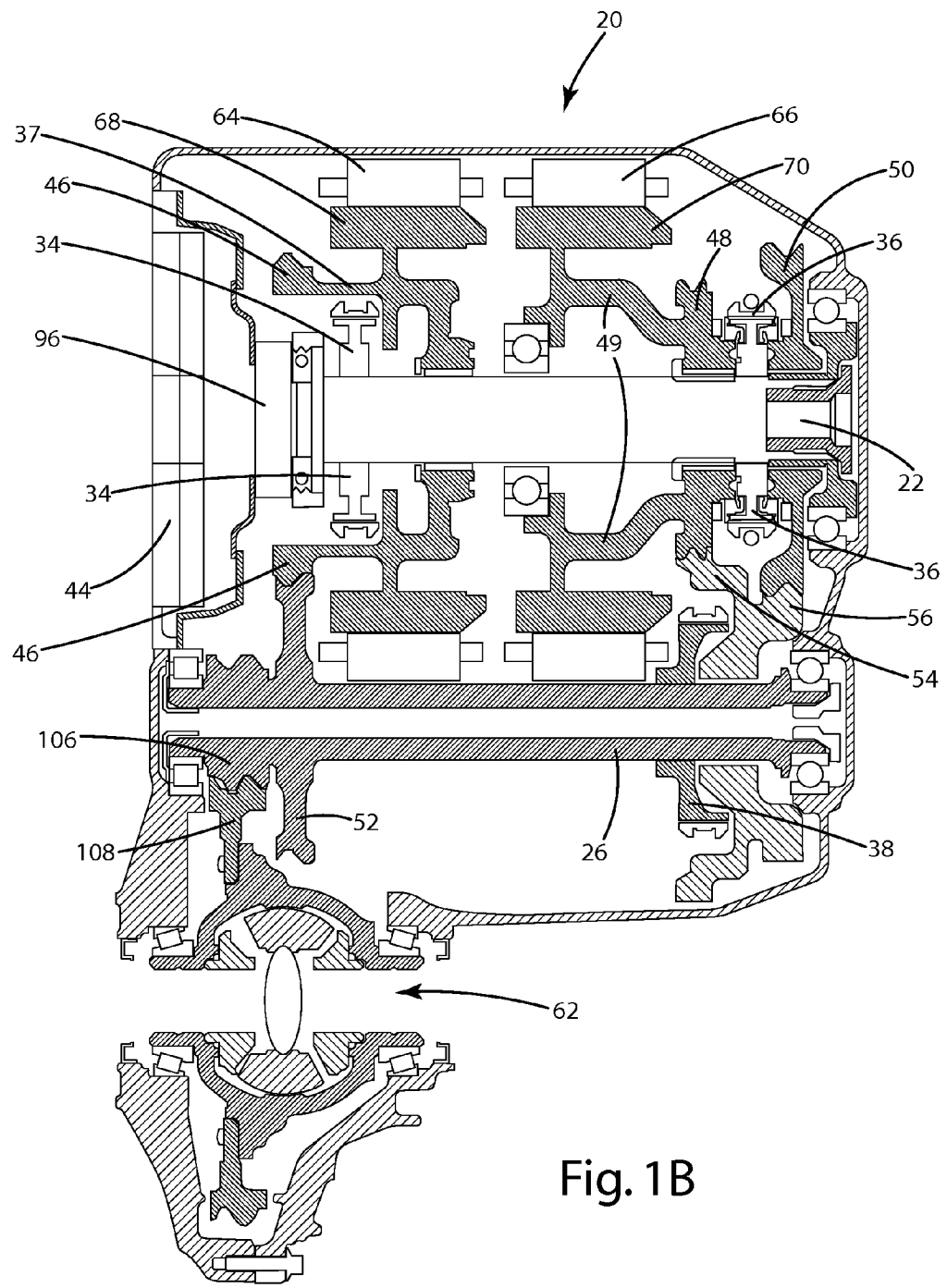
FIG. 1B is a cross-sectional view of the hybrid transmission depicted in FIG. 1A.

A multi-mode hybrid transmission in accordance with an embodiment of the present invention is shown in FIGS. 1A-1B. As the phrase is used herein, a multi-mode hybrid transmission describes any transmission capable of receiving power from both a prime mover and a source of stored power for operation in two or more power modes, including mechanical power mode, electric power mode, series hybrid power mode, or parallel hybrid power mode. In the present embodiment, the prime mover may be an internal combustion engine or a turbine, and the source of stored power may be an electrical energy storage device such as a battery. Other sources of stored power may also be used alone or in combination with the batteries, including pressurized fluids, for example. The multi-mode hybrid transmission of the present invention may be applied in front-wheel-drive and rear-wheel-drive vehicles, irrespective of whether the prime mover is adjacent the multi-mode hybrid transmission or is offset from the multi-mode hybrid transmission via one or more input shafts. While the multi-mode hybrid transmission of the present invention is conventionally utilized to provide torque to tractive wheels in a wheeled or tracked vehicle, it may be readily applied for any power transmitting or disseminating device in either a moving vehicle or a stationary application. Alternatively, the multi-mode hybrid transmission of the present invention may be incorporated in power packs, power take-off units, transfer cases or gearboxes, for example.

With reference to FIGS. 1A-1B, a transverse three-speed multi-mode hybrid transmission 20 includes an input shaft 22 to receive torque from a prime mover 24, an output shaft 26 operatively coupled to a final drive shaft 29, a plurality of gear pairs 28, 30, 32, a plurality of synchromesh clutch assemblies 34, 36, 38 to selectively engage a desired gear pair, and first and second electric machines 40, 42 selectively coupled to the input shaft 22. The prime mover 24 provides a rotational force to the input shaft 22 through a flywheel 44 disposed between the prime mover 24 and the input shaft 22. In order to transfer the rotational force from the prime mover 24 and flywheel 44 to the input shaft 22, a clutch 96, for example a wet or dry clutch, is positioned to engage and disengage the input shaft 22 from the flywheel 44 and prime mover 24. The output shaft 26 is disposed in parallel alignment with the input shaft 22, and the input and out shafts are interconnected by three toothed gear pairings 28, 30, 32. Each gear pairing includes an input gear 46, 48, 50 and an output gear 52, 54, 56 carried by the input shaft 22 and output shaft 26, respectively. Each input gear 46, 48, 50 transmits torque to each output gear 52, 54, 56 with which it meshes, wherein each gear pairing 28, 30, 32 defines a different torque path between the input shaft 22 and the output shaft 26. Additionally the adjacent second and third output gears 54, 56 form a bottle gear or sub-shaft with two gears 55, such that the second and third output gears 54, 56 are rigidly coupled to each other, optionally forming a single integral component, and rotate in fixed relation about the output shaft 26. The output shaft 26 ultimately provides a resulting rotational force to a final drive shaft 29. The final drive shaft 28 may include first and second half shafts 58, 60 supported by a differential 62. Additionally, each half shaft 58, 60 may support a respective tractive wheel (not shown) to provide a motive force for the hybrid vehicle.

As noted above, first and second electric machines 40, 42 are selectively coupled to the input shaft 22. Each electric machine 40, 42 can include a motor/generator system which functions as an electric motor and as an electric generator, optionally in conjunction with an electrical energy storage device (e.g., a battery). Accordingly, as a rotational force is applied to the input shaft 22, each electric machine 40, 42 can generate a source of electrical power for storage in the electrical energy storage device (not shown). Alternatively, each electric machine 40, 42 can provide a rotational force to the input shaft 22 to provide a resulting motive force for the hybrid vehicle. As also shown in FIG. 1, the first and second electric machines 40, 42 are axially displaced along the input shaft 22, and include a stator 64, 66 and a corresponding rotor 68, 70. Roller bearings 72 disposed between the input shaft 22 and each rotor 68, 70 permit low friction rotation of each rotor 68, 70 about the input shaft 22.

The operational configuration (e.g., parallel hybrid, series hybrid, electric only, etc.) and drive ratio (direct, overdrive, etc.) of the multi-mode hybrid transmission is controlled by a Transmission Control Unit (TCU) operatively connected to a number of sensors and clutch assemblies within the hybrid transmission. The sensors may include a plurality of speed sensors 74, 76 to measure the rotational speed of the prime mover 24, the first electric machine 40, the second electric machine 42, the input shaft 22, and the output shaft 26. The sensors may also include a plurality of position sensors (not shown) to detect the position of each shift assembly 34, 36, 38.

As shown in FIGS. 1A-1B, the first synchromesh clutch assembly 34 is mounted to the input shaft 22 between the clutch 96 and the first input gear 46. The first shift assembly 34 may include a shift fork (not shown), a synchronizer or synchronizing hub 33, and a shift collar or sleeve device 35 to selectively engage a clutch 39 disposed on the sub-shaft 37. Sub-shaft 37 is coupled to the first input gear 46 and the first motor rotor 68, such that the first input gear 46 and the first motor rotor 68 are rigidly coupled to each other and rotate in fixed relation about the input shaft 22. In operation, the shift fork can slide the synchronizing hub 33 over a clutch 39 to couple the sub-shaft 37 with the input shaft 22. As will be appreciated, the synchromesh clutch assembly 34 reduces the 'slip speed' or the difference in circumferential speed between the sub-shaft 37 and the input shaft 22. During the actuation of the synchromesh clutch assembly 34, the clutch 96 is normally engaged to thereby decouple the input shaft 22 from the prime mover 24.

In like manner, a second synchromesh clutch assembly 36 is mounted to the input shaft 22 and disposed between the second and third input gears 48, 50. The second clutch assembly 36 may include a shift fork 80, a synchronizer or synchronizing hub 84, 86, and a shift collar or sleeve device 90 to selectively engage either of the second or third input gears 48, 50. In operation, the shift fork 80 can slide the synchronizing hub 84, 86 over a clutch 94, 95, which then reduces the difference in circumferential speed between the shift collar 88, 90 and the adjacent input gear 48, 50. When the circumferential speeds are the same or nearly the same, the shift collar 88, 90 engages with the adjacent input gear 48, 50 to interconnect the input shaft 22 with one of the second or third gear pairings 30, 32. During this transition the clutch 96 is normally engaged to decouple the input shaft 22 from the prime mover 24. The second input gear 48 may be coupled to the second motor rotor 70 via a sub-shaft 49, such that the second input gear 48 and the second motor rotor 70 are rigidly coupled to each other, optionally forming a single integral component, and rotate in fixed relation about the input shaft 22.

In like manner, the third synchromesh clutch assembly 38 is coupled to the output shaft 26 adjacent the sub-shaft 55 supporting the second and third output gears 54, 56. The third clutch assembly 38 is thereby adapted to selectively couple the output shaft 26 with the second and third output gears 54, 56. To engage the second and third output gears 54, 56, which move in constant relation to one another, the shift fork 78 slides a synchronizing hub 82 over a clutch 92, which then reduces the difference in circumferential speed between the shift collar 88 and the adjacent output gear 54. When the circumferential speeds are the same or nearly the same, the shift collar 88 engages with the adjacent output gear 54 to interconnect the output shaft 26 with the second and third gear pairings 30, 32. During this transition the clutch 96 is normally engaged to decouple the input shaft 22 from the prime mover 24.

With reference to the transverse three-speed hybrid transmission of FIGS. 1A-1B, a number of operational modes will now be described. In mechanical power mode, where only the prime mover 24 provides a motive force for the hybrid vehicle, the transmission 20 provides three forward drive ratios—first, direct, and overdrive—corresponding to three separate torque paths. To achieve a first drive ratio, the second clutch assembly 36 engages the second input gear 48 to couple the second input gear 48 to the input shaft 22, and the third clutch assembly 38 engages the second output gear 54 to couple the second output gear 54 to the output shaft 26. To achieve a direct drive ratio, the second clutch assembly 36 disengages from the second input gear 48 and engages the third input gear 32, thereby coupling the third gear pairing 32 to the input shaft 22. To achieve overdrive, the third clutch assembly 38 disengages from the third gear pairing 32, and the first clutch assembly 34 engages the first input gear 46. In mechanical power mode, the first, direct, and overdrive drive ratios correspond to torque paths through the second 30, third 32, and first 28 gear pairing, respectively. During each transition between torque paths, the clutch 96 is normally engaged to thereby decouple the input shaft 22 from the prime mover 24.

Figure 11:
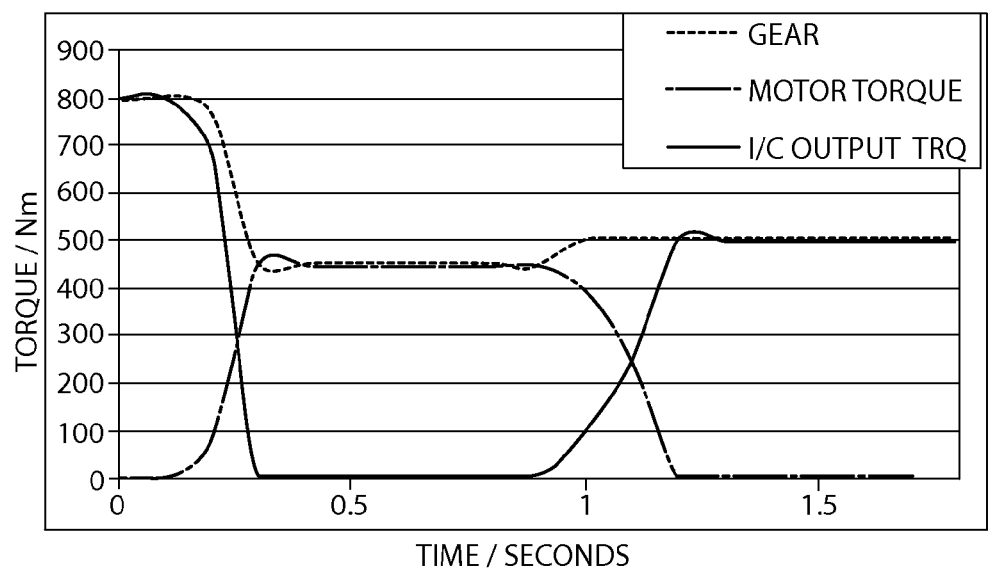
FIG. 11 is a graph representing a control strategy to reduce torque interrupt in accordance with an embodiment of the present invention.

When transitioning between drive ratios in mechanical power mode, the transmission 20 can experience brief periods where there is effectively no power applied to the output shaft 26 from the prime mover 24. In order to overcome these periods of 'torque interrupt,' one or both electric machines 40, 42 may provide supplemental power to the output shaft 26. For example, when transitioning from a first drive ratio to a direct drive ratio, the first electric machine 40 may provide a rotational force to the output shaft 22 through the first gear pairing 28. Similarly, when transitioning from a direct drive ratio to overdrive, the first electric machine 40 may provide a rotational force to the output shaft 26 through the first gear pairing 28. The foregoing control strategy is perhaps best illustrated with reference to FIG. 11. As shown in FIG. 11, the motive force applied by the prime mover 24 is dramatically reduced as the clutch 96 temporarily decouples the input shaft 22 from the prime mover 24. During this brief period, one or more available electric machines 40, 42 will provide a supplemental motive force to the output shaft 26. At or after the completion of the transition between drive ratios, the clutch 96 will disengage to thereby couple the prime mover 24 to the input shaft 22, as the electric machines 40, 42 reduce the supplemental motive force applied to the output shaft 26. The present invention thereby provides a continuous or near-continuous torque to the output shaft 26 without experiencing losses in torque normally associated with synchromesh clutch assemblies.

Referring again to FIGS. 1A-1B, electric power mode will now be described. In electric power mode, where one or both electric machines 40, 42 provides a motive force for the hybrid vehicle, the transmission 20 provides two forward drive ratios (first and overdrive) and one reverse drive ratio. To achieve a first drive ratio, the input shaft 22 is disengaged from the prime mover 24, the third clutch assembly 38 engages the second output gear 54, and the second electric machine 42 provides a rotational force in the forward direction to the second gear pairing 30. To achieve overdrive, the first motor 40 provides the rotational force in a forward direction to the first input gear 46 via the sub-shaft 37, which transfers power to the counter rotating output shaft 26 through the first output gear 52. To achieve the reverse drive ratio, the third clutch assembly 38 engages the second output gear 54 to couple the second gear pairing 30 to the output shaft 26, and the second motor 42 provides a rotational force in the reverse direction to the second input gear 48. In electric power mode, first, overdrive and reverse correspond to torque paths through the second 30, first 28, and second 30 (in the reverse direction) gear pairings, respectively.

Though electric power mode is described above in conjunction with one electric machine, each drive ratio in electric power mode can include power from both electric machines. This is accomplished by coupling the first and second electric machines 40, 42 to each other via the input shaft 22. For example, with the input shaft 22 disengaged from the prime mover 24, the first clutch assembly 34 and second clutch assembly 36 can engage the first and second electric machines 40, 42, respectively. As a result, any rotational force applied by the first electric machine 40 will be transferred to the second electric machine 42 along the input shaft 22, and any rotational force applied by the second electric machine 42 will be transferred to the first electric machine 40 along the input shaft 22. Alternatively, the available electric machine can be used to provide engine assist and shift ratio holding while the other electric machines completes a shift. Additionally, the available electric machine can be utilized for regenerative braking. This could be accomplished by changing the control mode for the first electric machine from motor to generator when the vehicle is not moving under power. This can make braking more effective and can charge an associated electrical energy storage device.

As noted above, control of the three-speed multi-mode hybrid transmission is automatically controlled through the supervisory/transmission control unit or TCU. The TCU utilizes sensors in the transmission 20 to detect position and speed of the input and output shafts 22, 26 and the clutch assemblies 34, 36, 38 to automatically shift the transmission 20 and provide power through multiple power sources. Additionally, the TCU can determine the best operating mode for performance, fuel economy and safety, and can communicate with other vehicle systems such as the prime mover 24 to request or implement a change of operation. As shown in FIG. 1A, speed sensors 74, 76 along with position sensors on the shift forks 78, 80 enable the TCU to control shift timing and provide hybrid power to prevent torque interrupt. In particular, a method is disclosed for providing a motive force for a hybrid vehicle having a transaxle 20 with a plurality of gear pairs 28, 30, 32 each defining a forward torque path. The method includes configuring the transaxle 20 to provide a first forward torque path, providing a first motive force through the first torque path, reconfiguring the transaxle to provide a second forward torque path for the first motive force, and supplementing the first motive force with a second motive force during periods of reduced torque associated with a change in the forward torque path. The first and second torque paths may be selectably engaged with a synchronized clutch, and the first motive force may be provided by the internal combustion engine or the first electric machine. The method may include providing a third motive force, where the second and third motive forces are generated by the first and second electric machines or first and second pumps. Additionally, the first electric machine 40 may provide a start-up torque to the prime mover 24 along the input shaft while the second electric machine 42 provides a motive force for the hybrid vehicle through one of the available torque paths. The method may alternatively include reversing the second or third motive force to provide a rearward torque path through the transaxle 20.

II. Second Embodiment

Figure 2:
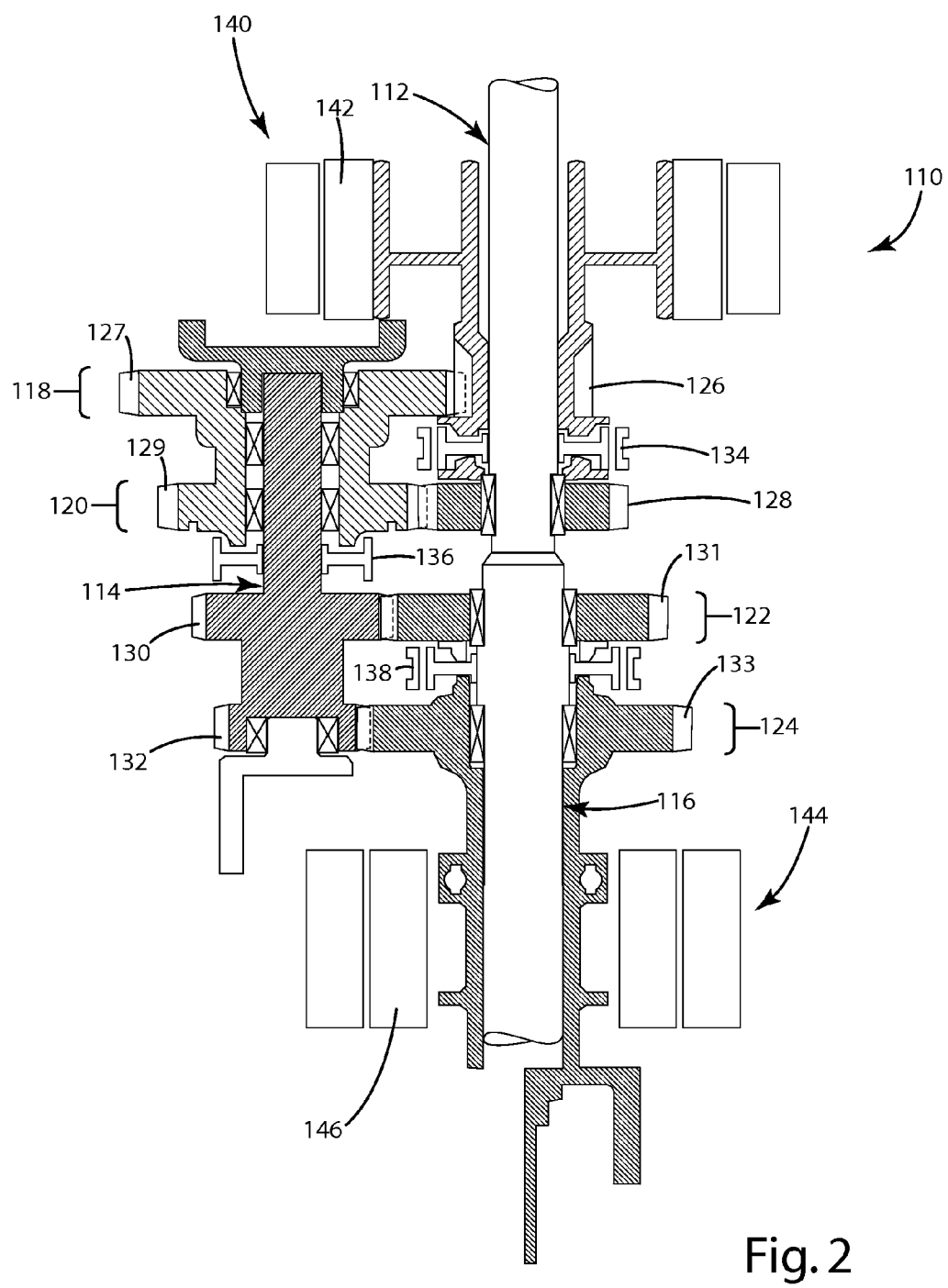
FIG. 2 is a cross-sectional view of a four-speed hybrid transmission in accordance with an embodiment of the present invention.

A longitudinal heavy-duty four-speed multi-mode hybrid transmission 110 in accordance with another embodiment of the present invention is shown in FIG. 2. The transmission includes an input shaft 112, a countershaft 114 disposed parallel to the input shaft 112, and an output shaft 116 coaxial with the input shaft 112. To achieve four forward drive ratios, the transmission includes first and second gear pairings 118, 120 to interconnect the input shaft 112 with the countershaft 114, and third and fourth gear pairings 122, 124 to interconnect the countershaft 114 with the output shaft 116. Each gear pairing includes an input gear 126, 128, 130, 132 and an output gear 127, 129, 131, 133, wherein the input gears 126, 128 for the first and second gear pairings are carried by the input shaft 112, and the input gears 130, 132 for the second and third gear pairings are carried by the countershaft 114. The first and second output gears 127, 129 are connected via a sub-shaft such that the first and second output gears 127, 129 are rigidly coupled to each other and rotate in fixed relation about the countershaft 114. Additionally, the third and fourth output gears 130, 132 are connected via a sub-shaft such that the third and fourth output gears 130, 132 are rigidly coupled to each other and rotate in fixed relation about the countershaft 114. A first electric machine 140 includes a rotor 142 carried by the input shaft 112, and the a second electric machine 144 includes a rotor 146 carried by the output shaft 116. A first synchromesh clutch assembly 134 selectively couples the input shaft 112 with the first motor 134 and first input gear 126 (interconnected via a sub-shaft) or the second input gear 128. A second synchromesh clutch assembly 136 selectively couples the countershaft 114 with the first and second output gears 127, 129. A third synchromesh clutch assembly 138 selectively couples the output shaft 116 with one of the third or fourth output gears 131, 133.

As noted above in connection with FIGS. 1A-1B, first and second electric machines 140, 144 are selectively coupled to the input shaft 112 and output shaft 116, respectively, to provide supplemental torque to the output shaft 116 during periods of reduced torque caused by a change in the torque path. Each electric machine 140, 144 can include a motor/generator system which functions as an electric motor and as an electric generator, optionally in combination with an electrical energy storage device (e.g., a battery). Accordingly, as a rotational force is applied to the input shaft 112, each electric machine 140, 144 can generate a source of electrical power for storage in the electrical energy storage device (not shown). Alternatively, each electric machine 140, 144 can provide a rotational force to the input shaft 112 to provide a resulting motive force for the hybrid vehicle. The present embodiment can be utilized in rear-wheel-drive vehicles, including military, off-road, and commercial wheeled vehicles, for example.

III. Third Embodiment

Figure 3:
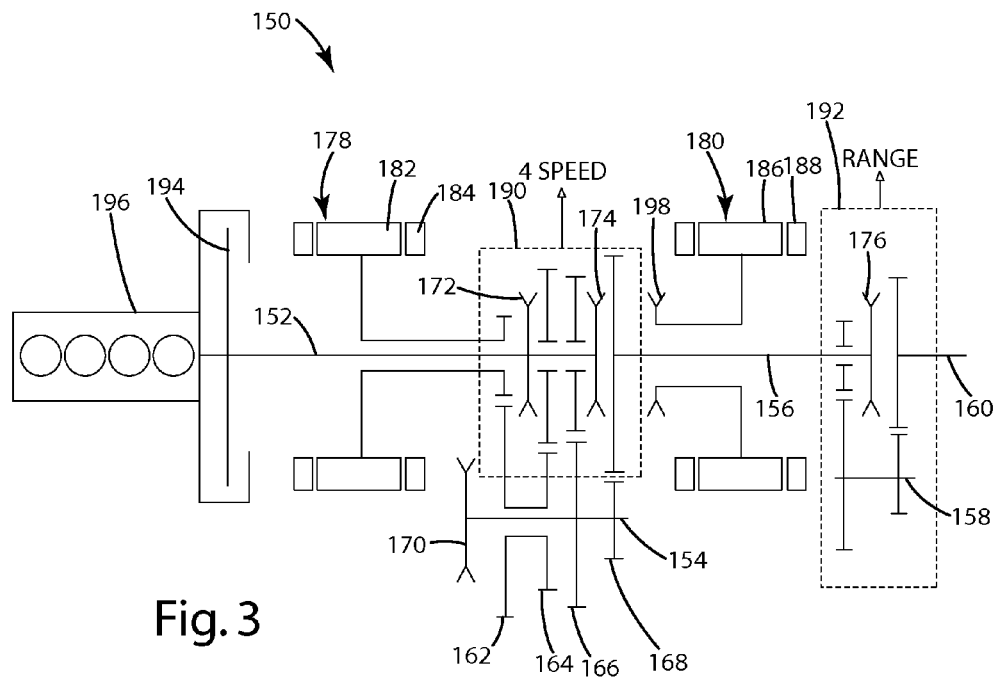
FIG. 3 is a schematic representation of a heavy duty eight-speed multi-mode transmission in accordance with an embodiment of the present invention.

A heavy-duty eight-speed multi-mode hybrid transmission 150 in accordance with another embodiment of the present invention is shown in FIG. 3. The transmission includes an input shaft 152, a first countershaft 154 disposed parallel to the input shaft 152, an intermediate shaft 156 coaxial with the input shaft 152, a second countershaft 158 and a output shaft 160 to couple to a final drive shaft (not shown). To achieve eight forward drive ratios, the transmission includes three gear pairings 162, 164, 166 to interconnect the input shaft 152 with the first countershaft 154. Each gear pairing includes an input gear and an output gear, wherein the input gears are carried by the input shaft 152, and the output gears are carried by the countershaft 154. The transmission 150 further includes four clutch assemblies 170, 172, 174, 176 to selectively engage a gear pairing, where each clutch assembly includes a shift fork and synchronizer commonly associated with manual transmission architectures. A first electric machine 178 includes a rotor 182 carried by the input shaft 152, and a second electric machine 180 includes a rotor 186 carried by the intermediate shaft 156. An output range selection device 192 provides additional drive ratios for mechanical and hybrid modes of operation. The range device 192 integrates the function of a two-speed transfer case into the transmission in with a high efficiency synchronizer 176.

In operation, first and second electric machines 178, 180 can be selectively coupled to the input shaft 152 and intermediate shaft 156, respectively, to provide supplemental torque during periods of reduced torque caused by a change in the torque path. Each electric machine 187, 180 can include a motor/generator system which functions as an electric motor and as an electric generator, optionally in conjunction with an electrical energy storage device (e.g., a battery). Accordingly, as a rotational force is applied to the input shaft 152, for example by an internal combustion engine 196, one or both electric machine 178, 180 can generate a source of electrical power for storage in the electrical energy storage device (not shown). Alternatively, one or both electric machine 178, 180 can provide a rotational force to the input shaft 152 to provide a resulting motive force for the hybrid vehicle. The present embodiment can also be utilized in rear-wheel-drive vehicles, for example, military, off-road, and commercial wheeled vehicles.

IV. Fourth Embodiment

Figure 4A:
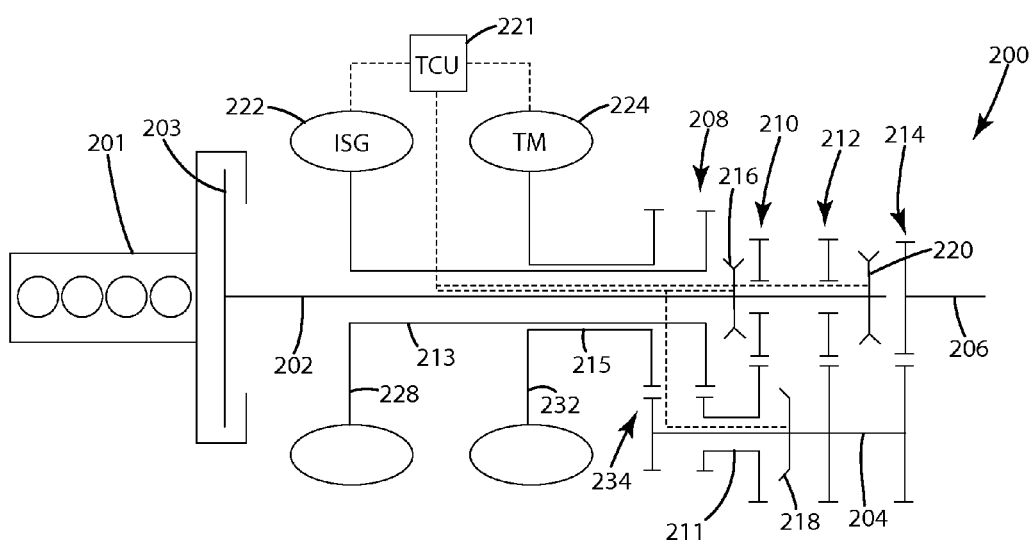
FIG. 4A is a schematic representation of a heavy duty four-speed multi-mode transmission in accordance with an embodiment of the present invention.
Figure 4B:
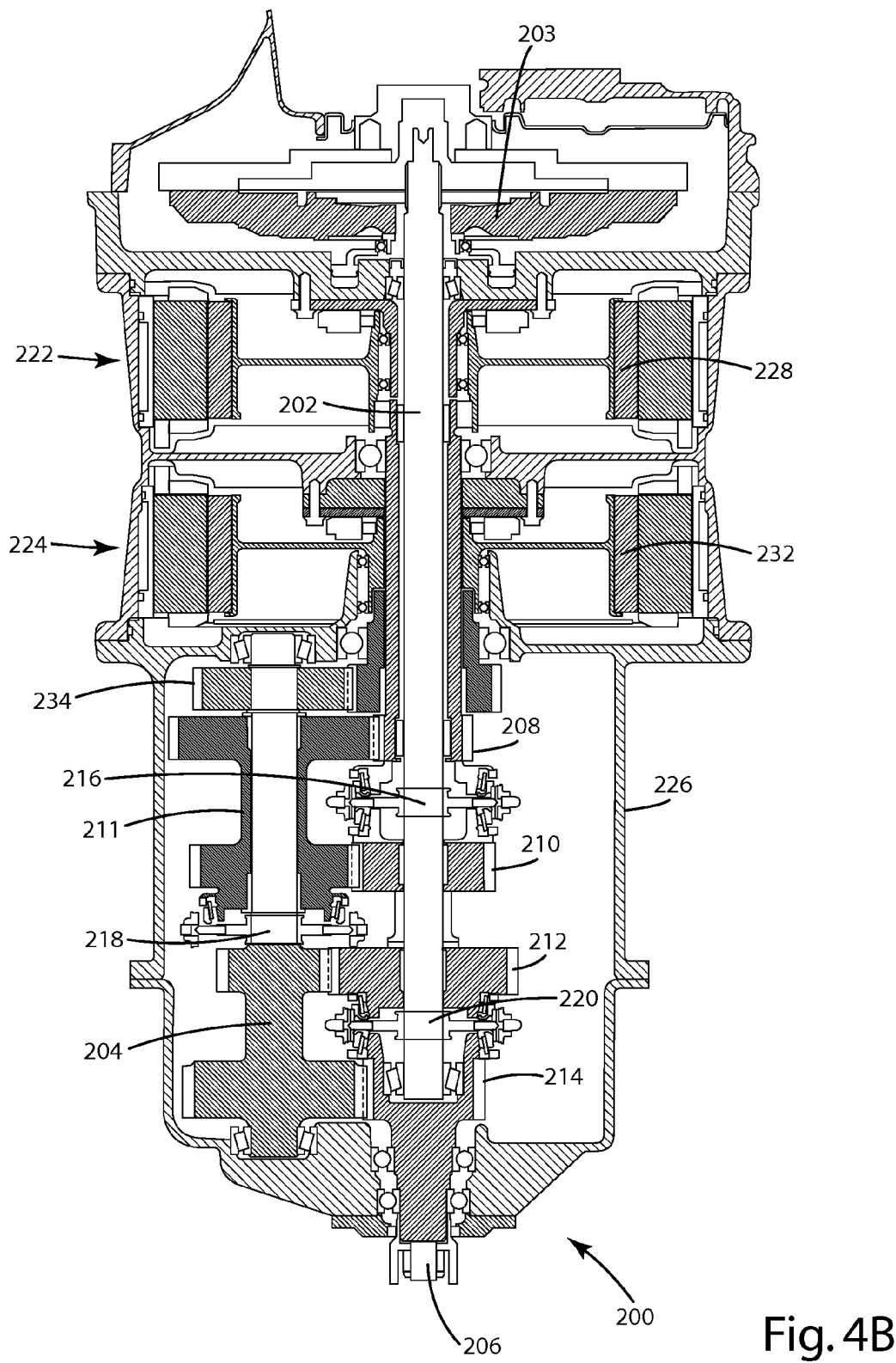
FIG. 4B is a cross-sectional view of the hybrid transmission depicted in FIG. 4A.

A heavy-duty four-speed multi-mode hybrid transmission 200 in accordance with another embodiment of the present invention is shown in FIGS. 4A-4B. The transmission includes an input shaft 202, a countershaft 204 disposed parallel to the input shaft 202, and an output shaft 206 coaxial with the input shaft 202 and in parallel alignment with the countershaft 204. A prime mover 201, for example an internal combustion engine, is selectively coupled to the input shaft 202 through a clutch 203, for example a wet or dry clutch. When the clutch 203 is engaged, the prime mover 201 is effectively disconnected from the input shaft 202. When the clutch is disengaged, the prime mover 201 is operatively connected to the input shaft 202 to provide a motive force to the vehicle. Two energy generating machines, shown first and second electric machines 222, 224, are mounted within the transmission 200, and include respective rotors 228, 232 carried by the input shaft 202 and freely rotatable about the same.

The transmission 202 further includes three gear pairings 208, 210, 212 (the first gear pairing 208, the second gear pairing 210 and the fifth gear pairing 212) to interconnect the input shaft 202 with the countershaft 204. Each of these gear pairings 208, 210, 212 include an input gear carried by the input shaft 202 and an output gear carried by the countershaft 204, and each input gear transfers torque to the corresponding output gear with which it meshes. Additionally, each input gear is freely rotatable about the input shaft 202, and is selectively coupled thereto by first or third synchromesh clutch assemblies 216, 220. The first synchromesh clutch assembly 216 is carried by the input shaft 202 and is disposed between adjacent input gears for the first and second gear pairings 208, 210. Though shown in a 'neutral' position in which neither the first nor the second input gears are engaged, the first clutch assembly 216 can displace left to engage the input gear for the first gear pairing 208 or right to engage the input gear for the second gear pairing 210. A third synchronizing clutch assembly 220 is carried by the input shaft 202 and is disposed adjacent the input gear for the fifth gear pairing 212 proximate the output shaft 206. Though shown in a 'neutral' position in FIGS. 4A-4B, the third clutch assembly 220 can displace left to engage to the input gear for the fifth gear pairing 212 or right to operatively engage the transfer shaft 206 for a direct drive ratio. A second synchronizing clutch assembly 218 is carried by the countershaft 204 and is disposed adjacent the output gear for the second gear pairing 210. Because the output gears for the first and second gear pairings 208, 210 are joined by a sub-shaft 211 and move in constant relation to each other, the second synchronizing clutch assembly 218 can also be disposed adjacent the output gear for the first gear pairing 208 with the same technical effect. As shown, the sub-shaft 211 concentrically encompasses at least a portion of the countershaft 204 and is freely rotatable with respect to the same.

As shown in FIGS. 4A-B, the first motor rotor 228 is coupled to a first sub-shaft 213 that is carried by the input shaft 202 and rotatable with respect to the same. The first motor rotor 228 extends radially from the first sub-shaft 213, and the first sub-shaft 213 interconnects the first motor rotor 228 and the input gear for the first gear pairing 208 such that the first motor rotor 228 and the input gear for the first gear pairing 208 move in constant relation with respect to each other. A second sub-shaft 215 interconnects the second motor rotor 232 and a third gear pairing 234 to operatively couple the second motor 224 to the countershaft 204. As shown, the second sub-shaft 215 concentrically encompasses a portion of the first sub-shaft 213 and a portion of the input shaft 202, and the first motor sub-shaft 213 concentrically encompasses a portion of the input shaft 202. The second motor rotor 232 extends radially from the second sub-shaft 215, and a fourth gear pairing 214 interconnects the countershaft 204 to the output shaft 206, including an input gear rigidly connected to the countershaft 204 and an output gear rigidly connected to the output shaft 206.

As explained herein, the present configuration can operate in mechanical power mode, electric power mode, series hybrid mode, and parallel hybrid power mode. In mechanical power mode, the transmission 600 can provide four forward drive ratios. To achieve a first forward drive ratio, the first clutch assembly 216 couples the input gear for the first gear pairing 208 to the input shaft 202 and the second clutch assembly 218 couples the corresponding output gear to the countershaft 204. Power applied to the input shaft 202 by the prime mover 201 is transferred to the countershaft 204 through a torque path defined by intermeshed gears in the first gear pairing 208, and transferred to the output shaft 206 through intermeshed gears in the fourth gear pairing 214. To transition to different drive ratios while in mechanical power mode, the clutch 203 decouples the prime mover 201 from the input shaft 202 to permit actuation of one or more synchromesh clutch assemblies 216, 218, 220. Once the desired torque path through the transmission is achieved, the clutch 203 re-couples the prime mover 201 to the input shaft 202 and provides power to the final drive shaft (not shown) through the selected torque path. When transitioning between drive ratios in mechanical power mode, the transmission 200 can experience brief periods where there is effectively no power applied to the output shaft 206 from the prime mover 201. In order to overcome these periods of torque interrupt, one or more electric machines 222, 224 will provide supplemental power to the input shaft 202 or countershaft 204. For example, the second electric machine or traction motor 224 will provide a forward torque to the second sub-shaft 215 and consequently the countershaft 204 through the third gear pairing 234. At or after the completion of the transition between drive ratios, the traction motor 224 will reduce the supplemental motive force applied to the countershaft 204. The present embodiment thereby provides a continuous or near-continuous torque to the final drive shaft without experiencing losses in torque normally associated with synchromesh clutch assemblies.

In electric, series hybrid and parallel hybrid power modes, the transmission can also provide at least four forward drive ratios, with the traction motor 224 providing the motive force for at least one forward drive ratios and the integrated starter/generator 222 providing the motive force for at least three forward drive ratios. As described above in connection with the mechanical power mode, shifting is accomplished by actuating one or more synchronizing clutch assemblies 216, 218, 220 under the control of a Transmission Control Unit 221. In series hybrid power mode, the prime mover 201 is operatively coupled to the integrated starter/generator 222 through the input gear for the first gear pairing 208 and the first sub-shaft 213. Additionally, the traction motor 224 is operatively coupled to the output shaft 206 through the countershaft 204 to provide a motive force for the vehicle. Power generated by the prime mover 201 is converted to electrical energy by the integrated starter/generator 222, stored in an electrical energy storage device such as a battery (not shown), and supplied to the traction motor 224 to provide a motive force for the vehicle. As will be appreciated, the transmission can also be configured for regenerative breaking in all modes of operation.

In addition to providing multiple modes of operation and multiple drive ratios, the present embodiment can also provide launch assist to alleviate high loads on the clutch. With the clutch 203 engaged, the traction motor 224 can provide a forward motive force to the vehicle through the second sub-shaft 215 and the fourth gear pairing 234. As the vehicle begins to accelerate, the input shaft 202 will rotate if operatively coupled to the output shaft 206 through the second synchromesh clutch assembly 220 or through the countershaft 204. Once the difference between the circumferential speed of the input shaft 202 and the prime mover crankshaft (not shown) approach acceptable levels, the clutch 203 will disengage to thereby couple the prime mover 201 and the input shaft 202. Once connected, the traction motor 224 can optionally cease to provide a power output while the prime mover 201 provides the primary motive force. As will be appreciated, launch assist may extend the service life of the clutch 203 by minimizing the loads inherent in vehicle launch. This can, for example, permit the use of a dry clutch in place of a less efficient wet clutch without limiting the service life of the transmission.

V. Fifth Embodiment

Figure 5:
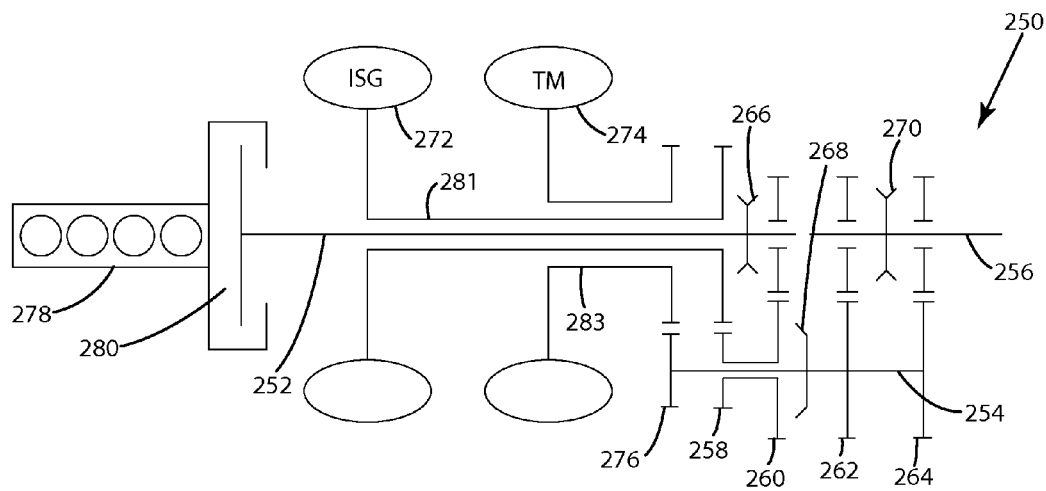
FIG. 5 is a schematic representation of a four-speed multi-mode transmission illustrating multiple traction motor modes in accordance with an embodiment of the present invention.

A four-speed multi-mode hybrid transmission 250 in accordance with another embodiment of the present invention is shown in FIG. 5. The transmission includes an input shaft 252, a countershaft 254 disposed parallel to the input shaft 252, and an output shaft 256 coaxial with the input shaft 252. To achieve four forward drive ratios, the transmission includes first and second gear pairings 258, 260 to interconnect the input shaft 252 with the countershaft 254, and third and fourth gear pairings 262, 264 to interconnect the countershaft 254 with the output shaft 256. Each gear pairing includes an input gear and an output gear, wherein the input gears for the first and second gear pairings 258, 260 are carried by the input shaft 252, and the input gears for the second and third gear pairings 262, 264 are carried by the countershaft 254. Three synchromesh clutch assemblies 266, 268, 270 transition between drive ratios and operating modes substantially as described in the first and fourth embodiments.

First and second electric machines 272, 274 are positioned adjacent each other within a transmission casing (not shown). The first electric machine 272, shown as an integrated starter/generator, includes a rotor carried by the input shaft 252 and coupled to the first gear pairing 258 input gear to function as a source of energy for regenerative breaking, for example. The second electric machine 274, shown as a traction motor, also includes a rotor carried by the input shaft 252. The traction motor 274 is coupled to the countershaft 254 through a fifth gear pairing 276 to provide supplemental torque during periods of start-up, launch and shift, for example. The first motor rotor is coupled to a first sub-shaft 281 that is carried by the input shaft 252 and rotatable with respect to the same. The first sub-shaft 281 interconnects the first motor rotor and the input gear for the first gear pairing 258 such that the first motor rotor and the input gear for the first gear pairing 258 move in constant relation with respect to each other. A second sub-shaft 283 interconnects the second motor rotor and a fourth gear pairing 276 to operatively couple the second motor 274 to the countershaft 254. As shown, the second sub-shaft 283 concentrically encompasses a portion of the first sub-shaft 281 and a portion of the input shaft 252, and the first motor sub-shaft 281 concentrically encompasses a portion of the input shaft 252. The present configuration provides regenerative breaking and vehicle launch assist, and may operate through at least four drive ratios in electric power mode, parallel and series hybrid modes, and mechanical power modes.

VI. Sixth Embodiment

Figure 6:
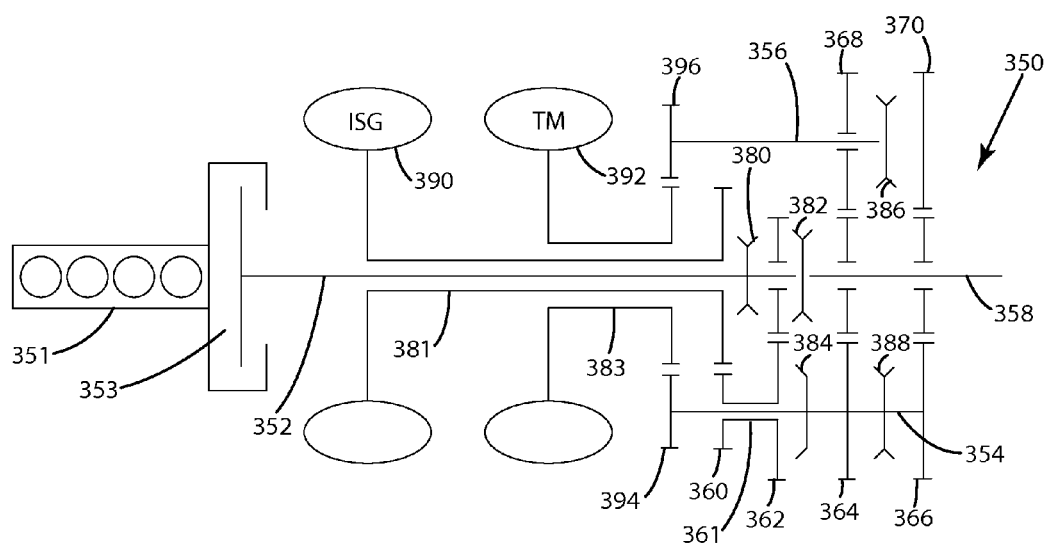
FIG. 6 is a schematic representation of an alternative four-speed multi-mode transmission with illustrating multiple traction motor modes in accordance with an embodiment of the present invention.

A multiple-speed multi-mode hybrid transmission 350 in accordance with another embodiment of the present invention is shown in FIG. 6. The transmission 350 includes an input shaft 352, first and second countershafts 354, 356 disposed parallel to the input shaft 352, and an output shaft 358 coaxial with the input shaft 352. To achieve multiple forward drive ratios, the transmission 350 includes first and second gear pairings 360, 362 to interconnect the input shaft 352 with the first countershaft 354, third and fourth gear pairings 364, 366 to interconnect the first countershaft 354 with the output shaft 358, and fifth and sixth gear pairings 368, 370 to interconnect the second countershaft 356 with the output shaft 358. Each gear pairing includes an input gear and an output gear, wherein each input gear transfers torque to each output gear with which it meshes. Additionally, the output gears for the first and second gear pairings 360, 362 extend from a common sub-shaft 361, such that the output gears for the first and second gear pairings 360, 362 move in constant relation to each other. The transmission 350 further includes five synchromesh clutch assemblies 380, 382, 384, 386, 388 to transition between drive ratios and operating modes substantially as described in the first and fourth embodiments.

First and second electric machines 390, 392 are positioned adjacent each other within a transmission casing (not shown). The first electric machine or integrated generator/starter 390 includes a rotor carried by the input shaft 352 and coupled to the first gear pairing 360 input gear via a first sub-shaft 381 to function primarily a source of energy for regenerative breaking, vehicle launch, start-up and electrical generation. The second electric machine or traction motor 392 also includes a rotor carried by the input shaft 352 and extending radially from a second sub-shaft 383. The traction motor 392 is coupled to each countershaft 354, 356 through seventh and eight gear pairings 394, 396, respectively, to provide supplemental torque during launch and during the transition between drive ratios, for example. Accordingly, the multi-mode transmission 350 provides regenerative breaking and vehicle launch assist, and may operate through at least five drive ratios in electric power mode, parallel and series hybrid modes, and mechanical power modes.

VII. Seventh Embodiment

Figure 7:
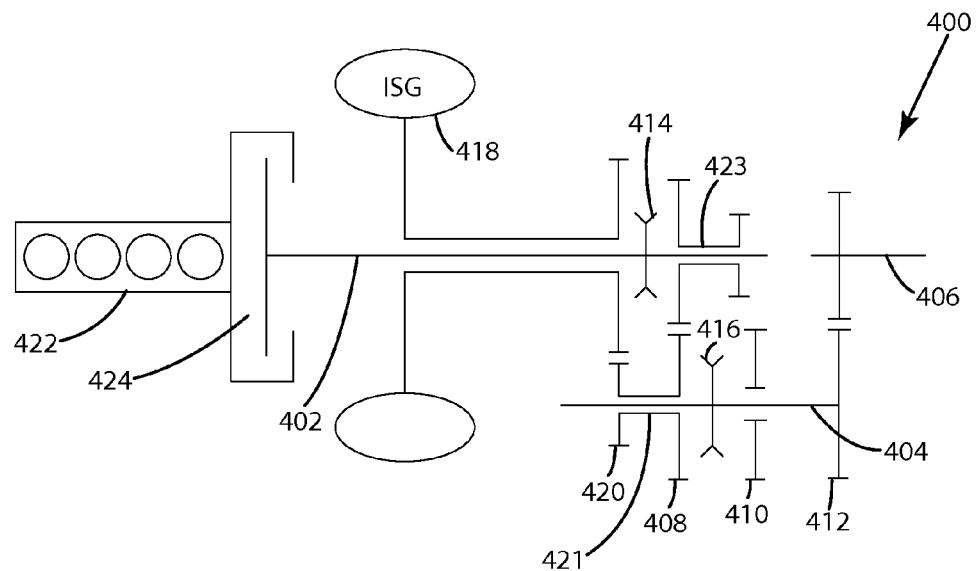
FIG. 7 is a schematic representation of an alternative four-speed multi-mode transmission with a single motor/generator and multiple traction motor modes in accordance with an embodiment of the present invention.

A four-speed multi-mode hybrid transmission 400 in accordance with another embodiment of the present invention is shown in FIG. 7. The transmission 400 includes an input shaft 402, a countershaft 404 disposed parallel to the input shaft 402, and an output shaft 406 coaxial with the input shaft 402. To achieve multiple forward drive ratios, the transmission 400 includes first, second and third gear pairings 420, 408, 410 to interconnect the input shaft 402 with the countershaft 404, and a fourth gear pairing 412 to interconnect the countershaft 404 with the output shaft 406. A first synchromesh clutch assembly 414 selectively couples the input gears for the first and second gear pairings 420, 420 to the input shaft 414, and optionally includes a shift fork, synchronizing hub and shift collar. A second synchromesh clutch assembly 416 selectively couples the output gears of the second and third gear pairings 408, 410 to the countershaft 404. Additionally, the output gears for the first and second gear pairings 420, 408 are connected to a first sub-shaft 421 carried by the countershaft and freely rotatable about the same, such that the output gears for the first and second gear pairings 420, 408 rotate in fixed relation with each other. The input gears for the second and third gear pairings are connected to a second sub-shaft 423 carried by the input shaft 402 and freely rotatable about the same, such that the input gears for the second and third gear pairings 408, 410 move in fixed relation with each other.

The hybrid transmission 400 further includes an electric machine, for example an integrated starter/generator 418, having a rotor carried by the input shaft 402. In mechanical mode, the hybrid transmission 400 can provide four forward drive ratios. In a first forward drive ratio, the second clutch assembly 416 couples the output gear for the first gear pairing 410 to the countershaft 404, and the first clutch assembly 414 couples the input gear for the first gear pairing 420 to the input shaft 402. To transition to a second forward drive ratio, the clutch 424 will decouple the input shaft 402 from the prime mover 422, the first clutch assembly 414 will couple the input gear for the second gear pairing 408 to the input shaft, and the clutch 424 will re-couple the input shaft 402 from the prime mover 422. To transition to a third forward drive ratio, the clutch 424 will decouple the input shaft 402 from the prime mover 422, the second clutch assembly 416 will disengage from the output gear for the third gear pairing 410 and engage the output gear for the second gear pairing 408, and the clutch 424 will re-couple the input shaft 402 from the prime mover 422. To transition to a fourth forward drive ratio, the clutch 424 will decouple the input shaft 402 from the prime mover 422, the first clutch assembly 414 will disengage from the input gear for the second gear pairing 408 and engage the input gear for the first gear pairing 420, and the clutch 424 will re-couple the input shaft 402 from the prime mover 422.

In hybrid mode, the electric machine 418 can provide an additional source of torque to the countershaft 404. The electric machine 418 can also provide the sole motive force in electric power mode with at least three forward drive ratios and three reverse drive ratios. As will be appreciated by one of ordinary skill in the art, the present configuration allows for torque to be applied from the output shaft 406 in a reverse direction to the electric machine 418 to recover energy and assist in vehicle deceleration. The electric machine 418 shown in FIG. 11 can also provide start-up and launch assist substantially as described in the fourth embodiment. Accordingly, the present embodiment provides a simplified transmission with a lower component cost.

VIII. Eighth Embodiment

Figure 8:
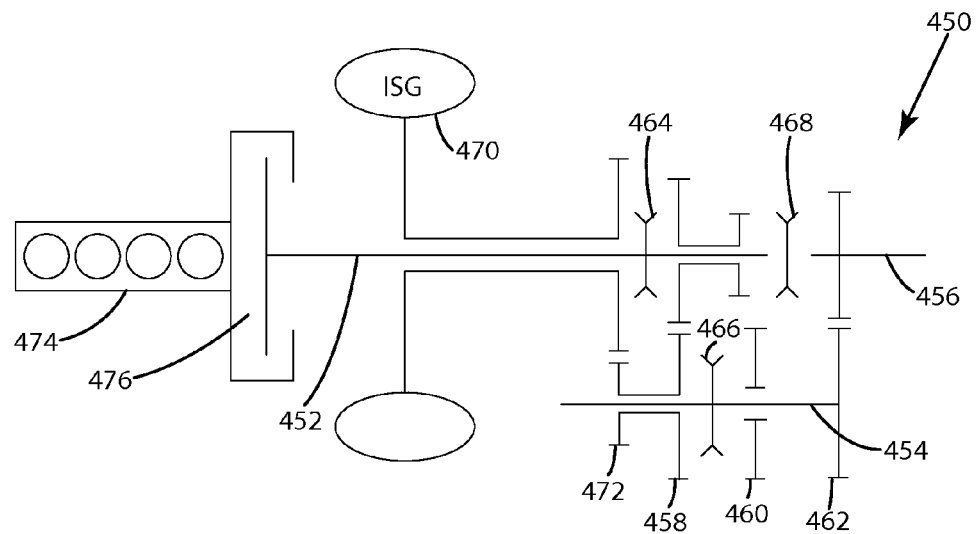
FIG. 8 is a schematic representation of a four-speed multi-mode transmission with a single motor/generator in accordance with an embodiment of the present invention.

A four-speed multi-mode hybrid transmission 450 in accordance with another embodiment of the present invention is shown in FIG. 8. The transmission 450 includes an input shaft 452, a countershaft 454 disposed parallel to the input shaft 452, and an output shaft 456 coaxial with the input shaft 452. To achieve multiple forward drive ratios, the transmission 450 includes first and second gear pairings 458, 460 to interconnect the input shaft 452 with the countershaft 454, and a third gear pairing 462 to interconnect the countershaft 454 with the output shaft 456. A first synchromesh clutch assembly 464 selectively engages the first and second gear pairings 458, 460 to the input shaft 452, and optionally includes a shift fork, synchronizing hub and shift collar. A second synchromesh clutch assembly 466 selectively engages either of the first or second gear pairings 458, 460 to the countershaft 454. A third synchromesh clutch assembly 468 carried by the input shaft 452 can selectively engages the output shaft 456 for a direct drive ratio.

The transmission further includes an electric machine, for example an integrated starter/generator 470, selectively coupled to the input shaft 452 with the first clutch assembly 464. A fourth gear pairing 472 interconnects the electric machine 470 with the countershaft 454. The electric machine 470 includes a rotor carried by the input shaft 452 and coupled to the fourth gear pairing 472, such that the rotor and the fourth gear paring 472 input gear each rotate in fixed relation.

In mechanical mode, the transmission 450 receives power from a prime mover, 474, for example an internal combustion engine, when the prime mover is coupled to the input shaft 452 via a clutch 476. To provide a first drive ratio, the first shift assembly 464 engages the input gear for the first gear pairing 458 to couple the input shaft 452 with the countershaft 454, and the second shift assembly 466 engages the output gear for the first gear pairing 458. To transfer to a direct drive ratio, the second shift assembly 466 disengages the first gear pairing 458 to effectively disconnect the countershaft 454 from the input shaft 452, and the third shift assembly 468 engages the output shaft 456 to effectively couple the input shaft 452 with the output shaft 456. To transfer to overdrive, the clutch 476 disengages the input shaft from the prime mover 474, the third shift assembly 468 disengages from the output shaft 456, the second shift assembly engages the output gear for the second gear pairing 460, and the clutch 476 reengages the input shaft 452. In hybrid mode, the electric machine 470 can provide an additional source of torque to the input shaft 452 or the countershaft 454. The electric machine 418 can also provide the sole motive force in electric power mode with at least three forward drive ratios and three reverse drive ratios. As will be appreciated by one of ordinary skill in the art, the present configuration allows for torque to be applied from the output shaft 456 in a reverse direction to the electric machine 470 to recover energy and assist in vehicle deceleration. The electric machine 470 shown in FIG. 8 can also provide start-up and launch assist substantially as described in the fourth embodiment, and can provide supplemental torque during periods of reduced power from the prime mover 474 caused by a change in the torque path.

IX. Ninth Embodiment

Figure 9:
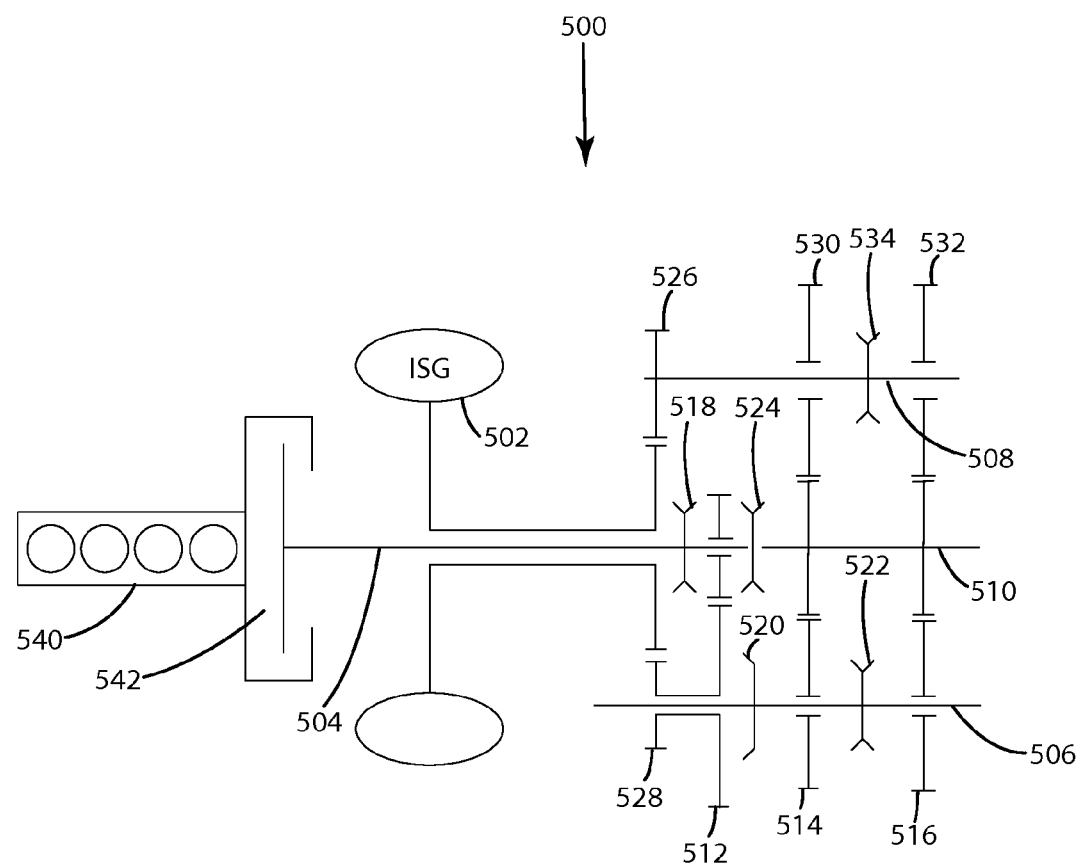
FIG. 9 is a schematic representation of a multi-speed, multi-mode transmission with a single motor/generator in accordance with an embodiment of the present invention.

A multiple-speed multi-mode hybrid transmission 500 with a single electric machine 502 in accordance with another embodiment of the present invention is shown in FIG. 9. The transmission 500 includes an input shaft, first and second countershafts 506, 508 disposed parallel to the input shaft 504, and an output shaft 510 coaxial with the input shaft 504. The transmission 500 includes a first gear pairing 512 to interconnect the input shaft 504 with the first countershaft 506, and second and third gear pairings 514, 516 to interconnect the first transfer shaft 506 with the output shaft 510. A first synchromesh clutch assembly 518 is carried by the input shaft 504 to selectively engage the input gear for the first gear pairing 512, and a second synchromesh clutch assembly 520 is carried by the first countershaft 506 to selectively engage the output gear for the first gear pairing. A third synchromesh clutch assembly 522 is carried by the first countershaft 506 to selectively engage either of the input gears for the second and third gear pairings 514, 516. A fourth shift assembly 524 is disposed between the input shaft 504 and the output shaft 510 to provide a direct drive ratio.

As noted above, the transmission 500 includes an electric machine 502 including a rotor carried by the input shaft 504 and freely rotatable with respect to the same. The rotor is selectively coupled to the input shaft 504 with the first clutch assembly 518. A fourth gear pairing 528 interconnects the rotor with the first countershaft 506, and a fifth gear pairing 526 interconnects the rotor with the second countershaft 508. Fifth and sixth gear pairings 530, 532 interconnect the second countershaft 508 and the output shaft 510. A fourth clutch assembly 534 is mounted to the second countershaft 508 and selectively engages either of the input gears for the fifth and sixth gear pairings 530, 532. Additionally, the output gears for the first and fourth gear pairings 512, 528 form a sub-shaft with two gears, such that the output gears for the first and fourth gear pairings 512, 528 move in fixed relation about the first countershaft 506. Accordingly, any power applied to the output gear of the first gear pairing 512 may be transferred to the electric machine 502, and any power applied to the output gear of the fourth gear pairing may be transferred to the input shaft 504 or countershaft 506. Accordingly, the present configuration allows for torque to be applied from the output shaft 510 in a reverse direction to the electric machine 502 to recover energy and assist in vehicle deceleration. The electric machine 502 shown in FIG. 9 can also provide start-up and launch assist substantially as described in the fourth embodiment, and can provide supplemental torque during periods of reduced power from the prime mover 540 caused by a change in the torque path.

X. Tenth Embodiment

Figure 10A:
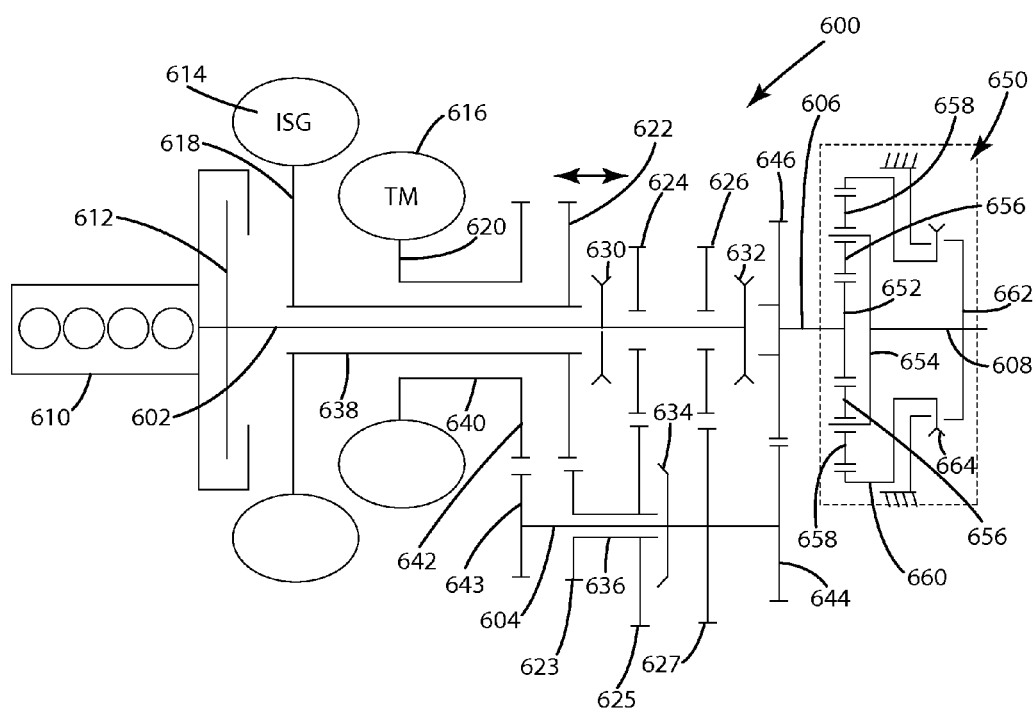
FIG. 10A is a schematic representation of a heavy duty eight-speed multi-mode transmission in accordance with an embodiment of the present invention.
Figure 10B:
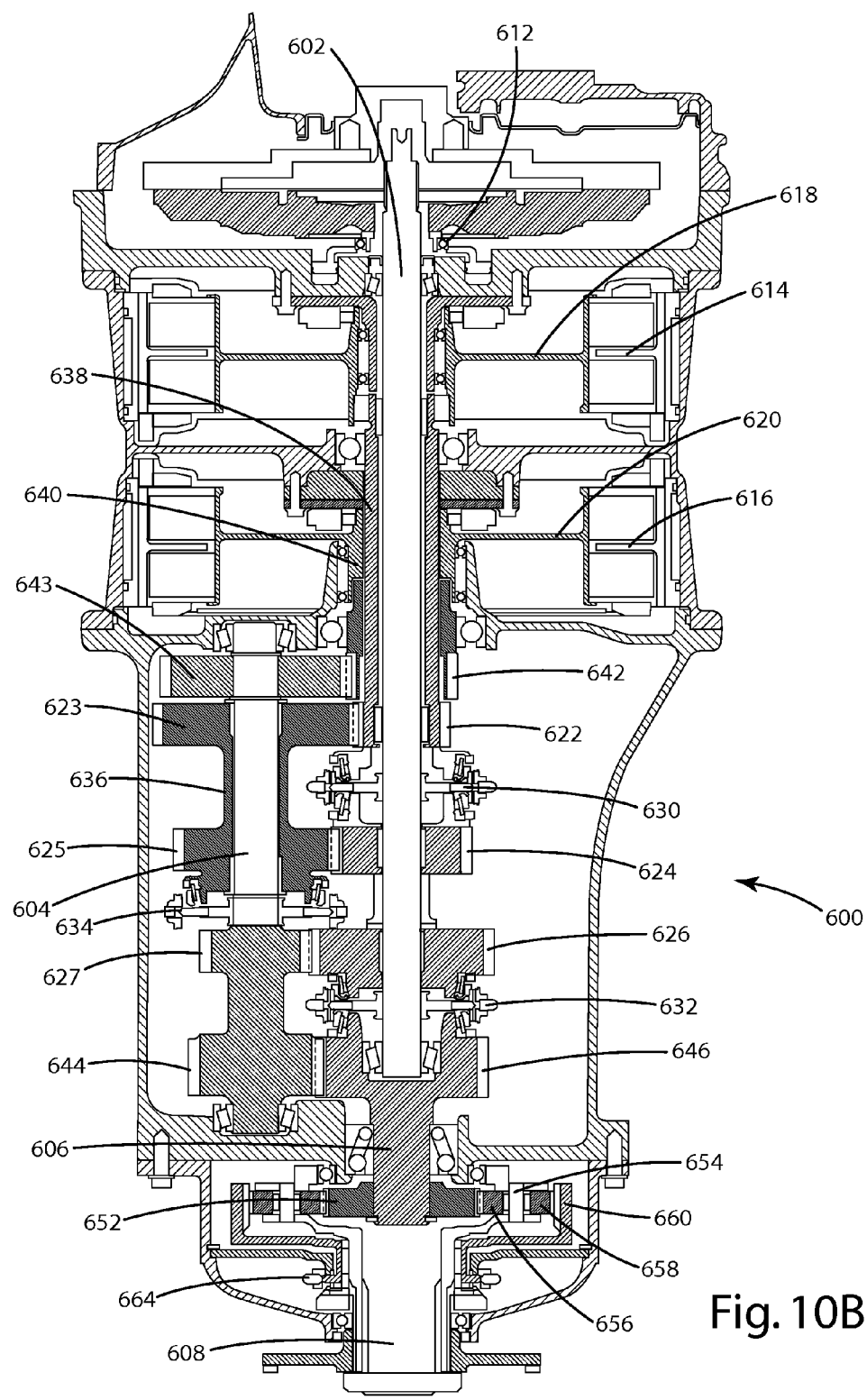
FIG. 10B is a cross-sectional view of the hybrid transmission depicted in FIG. 10A.

A heavy-duty eight-speed multi-mode hybrid transmission 600 in accordance with another embodiment of the present invention is shown in FIGS. 10A-10B. The transmission includes an input shaft 602, a countershaft 604 disposed parallel to the input shaft 602, an intermediate or transfer shaft 606 coaxial with the input shaft 602, and an output shaft 608 coaxial with the input shaft 602 and the transfer shaft 606. A prime mover 610, for example an internal combustion engine, is selectively coupled to the input shaft 602 through a clutch 612, for example a wet or dry clutch. When the clutch 612 is disengaged, the prime mover 610 is operatively connected to the input shaft 602 to provide a motive force to the vehicle. When the clutch 612 is engaged, the prime mover is effectively disconnected to the input shaft 602. Two energy generating machines shown as first and second electric machines 614, 616 are mounted within the transmission 600, and include respective rotors 618, 620 carried by the input shaft 602 and freely rotatable about the same.

The transmission 600 further includes three gear pairings to interconnect the input shaft 602 with the countershaft 604. Each gear pairing includes an input gear 622, 624, 626 carried by the input shaft 602 and an output gear 623, 625, 627 carried by the countershaft 604. Each input gear transfers torque to the corresponding output gear with which it meshes. Additionally, each input gear is freely rotatable about the input shaft 602, and is selectively coupled thereto by first or second synchronizing clutch assemblies 630, 632. The first synchronizing clutch assembly 630 is carried by the input shaft 602 and is disposed between the first and second input gears 622, 624. Though shown in a 'neutral' position in which neither the first nor the second input gears 622, 624 are engaged, the first clutch assembly 630 can displace left to engage the first input gear 622 or right to engage the second input gear 624. A second synchronizing clutch assembly 626 is carried by the input shaft 602 and is disposed adjacent the third input gear 626 proximate the transfer shaft 606. Though shown in a 'neutral' position in FIGS. 10A-10B, the second clutch assembly 632 can displace left to engage to the third input gear 626 or right to operatively engage the transfer shaft 606 for a direct drive ratio. A third synchronizing clutch assembly 634 is carried by the countershaft 604 and is disposed adjacent the second output gear 625. Because the first and second output gears 623, 625 are joined by a sub-shaft 636 and move in constant relation to each other, the third synchronizing clutch assembly 634 can also be disposed adjacent the first output gear 623 with the same technical effect. As shown, the sub-shaft 636 concentrically encompasses at least a portion of the countershaft 604 and is freely rotatable with respect to the same.

As also shown in FIGS. 10A-10B, the first motor rotor 618 is coupled to a first sub-shaft 638 carried by the input shaft 602 and rotatable with respect to the same. The sub-shaft 638 interconnects the first motor rotor 618 and the first input gear 622 such that the first motor rotor 618 and first input gear 622 move in constant relation with respect to each other. A second sub-shaft 640 interconnects the second motor rotor 620 and a fourth input gear 642 to operatively couple the second motor 616 to the countershaft 604. As shown, the second sub-shaft 640 concentrically encompasses a portion of the first motor sub-shaft 638 and a portion of the input shaft 602, and the first motor sub-shaft 638 concentrically encompasses a portion of the input shaft 602. A sixth gear pairing interconnects the countershaft 604 to the transfer shaft 606, including an input gear 644 rigidly connected to the countershaft 604 and an output gear 646 rigidly connected to the transfer shaft 606.

To provide an additional four drive ratios, the transmission includes a rangebox 650 including a planetary gear set. The planetary gear set includes a sun gear 652 connected to the transfer shaft 606, a first ring gear 654, and a plurality of input planetary gears 656 engaging both the sun gear 652 and the first ring gear 654. The rangebox 650 also includes a plurality of output planetary gears 658 engaging the first carrier gear 654 and a second carrier gear 660. The second carrier gear 660 can be selectively coupled to an output gear 662 fixed to the output shaft via a fourth synchronizing clutch assembly 664. Though shown in the neutral position, the clutch assembly can move right to engage the output gear 662 to provide four drive ratios, forming a power path from prime mover 610, first electric machine 614, and second electric machine 616, independent and cooperatively, to the output shaft 608 and final drive shaft (not shown). Alternatively, the clutch assembly 664 can move left to engage a grounded member to provide an additional four forward drive ratios, again forming a power flow path from prime mover 610, first electric machine 614, and second electric machine 616, independent and cooperatively, to the output shaft 608 and final drive shaft. Accordingly, the clutch assembly 664 is operable to disengage at least the traction motor 616 from the final drive shaft. This configuration permits operation of the traction motor 616 as a generator when the vehicle is stationary, i.e., not receiving a driving force from one of the prime mover 610, integrated starter/generator 614, or traction motor 616. To power an appliance using the traction motor 616 as a generator, the prime mover 610 drives the input shaft 602, which in turn drives the traction motor rotor 620 through gears 642 and 643. In this configuration, the first and third clutch assemblies 630, 634 would displace left to engage the corresponding gear 622, 625. Additionally, the integrated starter/generator 614 may also function as a generator when the vehicle is stationary, both alone and in combination with the traction motor 620. Accordingly, the first and second electric machines 614, 616 are simultaneously drivable by the input shaft to convert power from the prime mover into electrical energy, thus enabling downsizing of each electric machine 614, 616 if high generation loads are required when the vehicle is stationary. This is suitable for providing power to any external load energized by an electrical current.

As explained herein, the present configuration can operate in mechanical power mode, electric power mode, series hybrid mode, and parallel hybrid power mode. In mechanical power mode, the transmission 600 can provide eight forward drive ratios. To achieve a first forward drive ratio, the first clutch assembly 630 couples the first input gear 622 to the input shaft 602 and the second clutch assembly 634 couples the first output gear 623 and second sub-shaft 636 to the countershaft 604. Power applied to the input shaft 602 by the prime mover 610 is transferred to the countershaft 604 through a torque path defined by intermeshed first input and output gears 622, 623, and transferred to the transfer shaft 606 through intermeshed input and output gears 644, 646. Power is then diverted through the range box 650 to the output shaft 608, and consequently to the final draft shaft (not shown) and tractive vehicles. To transition to different drive ratios while in mechanical power mode, the clutch 612 decouples the prime mover 610 from the input shaft 602 to permit actuation of one or more synchromesh clutch assemblies 630, 632, 634, 664. Once the desired torque path trough the transmission is achieved, the clutch 612 re-couples the prime mover 610 to the input shaft 602 and provides power to the final drive shaft through the selected torque path. When transitioning between drive ratios in mechanical power mode, the transmission 600 can experience brief periods where there is effectively no power applied to the output shaft 608 from the prime mover 610. In order to overcome these periods of torque interrupt, one or more electric machines 614, 616 will provide supplemental power to the input shaft 602 or countershaft 604. For example, the second electric machine or traction motor 616 will provide a forward torque to the second sub-shaft 640 and consequently the countershaft 640. At or after the completion of the transition between drive ratios, the traction motor 616 will reduce the supplemental motive force applied to the countershaft 604. The present embodiment thereby provides a continuous or near-continuous torque to the final drive shaft without experiencing losses in torque normally associated with synchromesh clutch assemblies.

In electric, series hybrid and parallel hybrid power modes, the transmission can also provide at least eight forward drive ratios, with the traction motor 616 providing the motive force for at least two forward drive ratios and the integrated starter/generator 614 providing the motive force for at least six forward drive ratios. As described above in connection with the mechanical power mode, shifting is accomplished by actuating one or more synchronizing clutch assemblies 630, 632, 634, 664 under the control of a Transmission Control Unit (not shown). In series hybrid power mode, the prime mover 610 is operative coupled to the integrated starter/generator 614 via the first input gear 622 and the first sub-shaft 638, and the traction motor 616 provides a motive force for the vehicle through the countershaft 604. Power generated by the prime mover 610 is converted to electrical energy by the integrated starter/generator 614, stored in an electrical energy storage device such as a battery (not shown), and supplied to the traction motor 616 to provide a motive force for the vehicle. As will be appreciated, the transmission can also be configured for regenerative breaking in all modes of operation.

In addition to providing multiple modes of operation and multiple drive ratios, the present embodiment can also provide launch assist to alleviate high loads on the clutch. With the clutch 612 engaged, the traction motor 616 can provide a forward motive force to the vehicle through the second sub-shaft 640 and the connected input gear 642. As the vehicle begins to accelerate, the input shaft 602 will rotate if operatively coupled to the output shaft 608 through either of the countershaft 604 or the transfer shaft 606. Once the difference between the circumferential speed of the input shaft 602 and the prime mover crankshaft (not shown) approach acceptable levels, the clutch 612 will disengage to thereby couple the prime mover 610 and the input shaft 602. Once connected, the traction motor 616 can optionally cease to provide a power output while the prime mover 610 provides the primary motive force. As will be appreciated, launch assist may extend the service life of the clutch 612 by minimizing the loads inherent in vehicle launch. This can, for example, permit the use of a dry clutch in place of a less efficient wet clutch without limiting the service life of the transmission.

XI. Conclusion

The above embodiments include a hybrid transmission with increased efficiencies over hybrid transmissions known in the art. By utilizing synchromesh clutch assemblies common in manual transmissions in combination with one or more electric machines, the above embodiments provide a near-continuous supply of torque without experiencing torque losses normally associated with manual transmission architectures. Additionally, the present invention provides a hybrid transmission with multiple modes of operation, including mechanical power mode, electrical power mode, and series or parallel hybrid modes, while also including regenerative breaking, start-up, and launch assist for use in a wide variety of applications.

The above description is that of current embodiments of the invention. Various alterations and changes can be made without departing from the spirit and broader aspects of the invention as defined in the appended claims, which are to be interpreted in accordance with the principles of patent law including the doctrine of equivalents. Any reference to elements in the singular, for example, using the articles "a," "an," "the," or "said," is not to be construed as limiting the element to the singular.

The embodiments of the invention in which an exclusive property or privilege is claimed are defined as follows:

1. A multi-mode hybrid transmission for a vehicle, comprising:
   an input shaft to receive torque from a prime mover;
   a countershaft operatively connected to a final drive shaft, wherein the input shaft and the countershaft are in parallel alignment;

first and second gear pairs having different gear ratios, each one of the first and second gear pairs defining a torque path and including an input gear carried by the input shaft and an output gear carried by the countershaft, wherein the output gears are supported on a sub-shaft that is rotatable relative to the countershaft;

a first synchromesh clutch assembly coupled to the input shaft to selectively engage the input gear of one of the first and second gear pairs, wherein only one of the first and second of gear pairs transfers torque from the input shaft to the countershaft when engaged by the first synchromesh clutch assembly; and an electric machine including a rotor carried by the input shaft, wherein the electric machine is operable to provide supplemental torque to the countershaft during periods of reduced torque from the prime mover associated with a change in the torque path.

2. The multi-mode hybrid transmission of claim 1, wherein the electric machine is a second electric machine, and further including a first electric machine including a rotor carried by the input shaft, wherein the first and second electric machines are adapted to covert rotary speed of the input shaft into electrical energy.

3. The multi-mode hybrid transmission of claim 2 wherein the first and second electric machines are adapted to provide torque to the countershaft shaft to provide a motive force for the vehicle.

4. The multi-mode transmission of claim 2 wherein the first and second electric machines are adapted to provide torque to the input shaft to start the prime mover from a condition of rest.

5. The multi-mode hybrid transmission of claim 2 wherein the first electric machine is adapted to provide power to the countershaft and the second electric machine is adapted to simultaneously convert rotary speed of the input shaft into conversion to electrical energy.

6. The multi-mode hybrid transmission of claim 2 wherein the output gears for the first and second gear pairs are fixedly attached to each other to rotate in fixed relation about a common axis.

7. The multi-mode hybrid transmission of claim 6, wherein the sub-shaft is a second sub-shaft and further including a first sub-shaft to connect the rotor for the first electric machine with the input gear for the first gear pair, wherein the first sub-shaft concentrically encompasses at least a portion of the input shaft.

8. The multi-mode hybrid transmission of claim 2 further including:
a plurality of speed sensors to detect the rotational speed of the first and second motors;
a plurality of position sensors to detect the position of each of the plurality of synchronizing clutch assemblies; and
a transmission control unit operatively connected to the plurality of speed sensors and the plurality of position sensors, the transmission control unit being adapted to vary the speed and direction of the first and second electric machines and to selectively engage each of the first and second clutch assemblies to achieve a desired torque path.

9. A multi-mode hybrid transmission for a vehicle, comprising:
an input shaft to receive torque from a prime mover;
a countershaft operatively connected to a final drive shaft, wherein the input shaft and the countershaft are in parallel alignment;
first and second gear pairs having different gear ratios, each one of the first and second gear pairs defining a torque path and including an input gear carried by the input shaft and an output gear carried by the countershaft, wherein the output gears for the first and second gear pairs are fixedly attached to each other to rotate in fixed relation about a common axis;
a first synchromesh clutch assembly coupled to the input shaft to selectively engage the input gear of one of the first and second gear pairs, wherein only one of the first and second of gear pairs transfers torque from the input shaft to the countershaft;
first and second electric machines each including a rotor carried by the input shaft, wherein the second electric machine is operable to provide supplemental torque to the countershaft shaft during periods of reduced torque from the prime mover associated with a change in the torque path, and wherein the first and second electric machines are adapted to covert rotary speed of the input shaft into electrical energy;
a first sub-shaft to connect the rotor for the first electric machine with the input gear for the first gear pair, wherein the first sub-shaft concentrically encompasses at least a portion of the input shaft;
a second sub-shaft concentrically encompassing at least a portion of the input shaft, the rotor for the second electric machine extending radially therefrom; and
a third gear pair defining a torque path from the second electric machine to the countershaft and including a third input gear extending radially from the second sub-shaft and a third output gear carried by the countershaft and fixed thereto.

10. The multi-mode hybrid transmission of claim 9 further including a second synchromesh clutch assembly coupled to the countershaft to selectively engage the output gear for one of the first and second gear pairs.

11. The multi-mode transmission of claim 10 further including:
an output shaft disposed adjacent to the input shaft, wherein the output shaft is disposed in coaxial alignment with the input shaft and in parallel alignment with the countershaft;
a fourth gear pairing defining a torque path from the countershaft to the output shaft and including a fourth input gear carried by the countershaft and fixed thereto and a fourth output gear carried by the output shaft and fixed thereto.

12. The multi-mode transmission of claim 11 further including a third synchromesh clutch assembly coupled to the input shaft to selectively engage the output gear of the fourth gear pair.

13. The multi-mode transmission of claim 12 further including a fourth synchromesh clutch assembly positioned in a power flow path between the first electric machine and the final drive shaft to selectively disengage the first electric machine from the final drive shaft.

14. A multi-mode hybrid transmission for a motor vehicle having an engine, comprising:
an input shaft to receive power from the engine;
a countershaft operatively connected to an output shaft rotatable with respect to the input shaft, wherein the input shaft and the countershaft are in parallel alignment;
a first intermeshed gear pair including a first input gear carried by the input shaft and a first output gear carried by the countershaft;
a second intermeshed gear pair including a second input gear carried by the input shaft and a second output gear carried by the countershaft, wherein the first and second output gears are coupled to each other to rotate in fixed relation about a common axis;

a first clutch assembly operable for releasably coupling the first input gear to the input shaft to establish a first torque path between the input shaft and the output shaft, and for releasably coupling the second input gear to the input shaft to establish a second torque path between the input shaft and the output shaft;

first and second electric machines each including a rotor carried by the input shaft, wherein the second electric machine is adapted to provide a motive force for the vehicle and the first electric machine is adapted to simultaneously convert rotary speed of the input shaft into electrical energy.

15. The multi-mode hybrid transmission of claim 14 further including a controller for controlling actuation of the first and second electric machines in at least four modes of operation.

16. The multi-mode hybrid transmission of claim 14 wherein the first and second electric machines are adapted to provide a start-up torque to the engine when operating from a condition of rest.

17. The multi-mode hybrid transmission of claim 14 wherein the first and second electric machines are adapted to independently and cooperatively drive one of the input shaft and the countershaft when the input shaft is disengaged from the engine, the first and second electric machines being further adapted to independently and cooperatively synchronize the rotary speed of the input shaft with the rotary speed of the engine.

18. The multi-mode hybrid transmission of claim 14 wherein the first and second electric machines are adapted to independently and cooperatively drive at least one of the input shaft and the countershaft during periods of reduced power from the engine associated with a change in torque path.

19. The multi-mode hybrid transmission of claim 14 further including a first sub-shaft to connect the rotor for the first electric machine with the input gear for the first gear pair, wherein the first sub-shaft concentrically encompasses at least a portion of the input shaft.

20. A multi-mode hybrid transmission for a motor vehicle having an engine, comprising:
    an input shaft to receive power from the engine;
    a countershaft operatively connected to a final drive shaft, wherein the input shaft and the countershaft are in parallel alignment;
    a first intermeshed gear pair including a first input gear carried by the input shaft and a first output gear carried by the countershaft;
    a second intermeshed gear pair including a second input gear carried by the input shaft and a second output gear carried by the countershaft, wherein the first and second output gears are coupled to each other to rotate in fixed relation about a common axis;
    a first clutch assembly operable for releasably coupling the first input gear to the input shaft to establish a first torque path between the input shaft and the output shaft, and for releasably coupling the second input gear to the input shaft to establish a second torque path between the input shaft and the output shaft;
    first and second electric machines each including a rotor carried by the input shaft, wherein the second electric machine is adapted to provide a motive force for the vehicle and the first electric machine is adapted to simultaneously convert rotary speed of the input shaft into electrical energy;
    a first sub-shaft to connect the rotor for the first electric machine with the input gear for the first gear pair, wherein the first sub-shaft concentrically encompasses at least a portion of the input shaft;
    a second sub-shaft concentrically encompassing at least portion of the first sub-shaft, the rotor for the second electric machine extending radially therefrom; and
    a third gear pair defining a torque path from the second electric machine to the countershaft and including a third input gear extending radially from the second sub-shaft and a third output gear carried by the countershaft and fixed thereto.

21. The multi-mode hybrid transmission of claim 20 further including a second synchromesh clutch assembly coupled to the countershaft to selectively engage the first or second output gear.

22. The multi-mode transmission of claim 21 further including:
    an output shaft disposed adjacent to the input shaft, wherein the output shaft is disposed in coaxial alignment with the input shaft and in parallel alignment with the countershaft;
    a fourth gear pair defining a torque path from the countershaft to the output shaft and including a fourth input gear and a fourth output gear, the fourth input gear being carried by the countershaft and fixed thereto and the fourth output gear being carried by the output shaft and fixed thereto.

23. The multi-mode transmission of claim 22 further including a third synchromesh clutch assembly coupled to the input shaft to selectively engage the fourth output gear.

24. The multi-mode transmission of claim 23 including a fourth synchromesh clutch assembly positioned in a power flow path between the first electric machine and the final drive shaft to selectively disengage the first electric machine from the final drive shaft, wherein the first and second electric machines are simultaneously drivable by the input shaft to convert power from the prime mover into electrical energy.

25. A multi-mode hybrid transmission comprising:
    an input shaft to receive torque from a prime mover;
    a counter shaft disposed in parallel alignment with the input shaft and operably connected to an output shaft rotatable with respect to the input shaft;
    a plurality of gear pairs having different drive ratios, each one of the plurality of gear pairs defining a torque path between the input shaft and the countershaft;
    first and second synchromesh clutch assemblies operable to releasably engage one of the plurality of gear pairs;
    first and second energy generation machines each including a rotor carried by the input shaft, wherein the first and second energy generation machines are each operable to drive at least one of the input shaft and the countershaft; and
    a controller to control actuation of the first and second energy generation machines and first and second synchromesh clutch assemblies, wherein the prime mover and the first and second energy generation machines are operable to independently and cooperatively drive the final drive shaft.

26. The multi-mode transmission of claim 25 wherein the first and second energy generation machines are first and second electric machines.

27. The multi-mode transmission of claim 25 wherein the first and second energy generation machines are first and second pump assemblies.

28. The multi-mode transmission of claim 25 wherein the prime mover is an internal combustion engine.

29. The multi-mode transmission of claim 28 wherein the first and second energy generation machines are operable to independently and cooperatively provide a start-up torque to the engine when operating from rest.

30. The multi-mode transmission of claim 28 wherein the first and second energy generation machines are operable to independently and cooperatively synchronize the rotary speed of the input shaft with the rotary speed of the engine when the input shaft is disengaged from the engine.

31. The multi-mode transmission of claim 25 wherein the first and second energy generation machines are operable to independently and cooperatively drive at least one of the input shaft and the countershaft during periods of reduced power from the prime mover associated with a change in torque path.

32. The multi-mode transmission of claim 25 wherein the second energy generation machine is adapted to drive the output shaft and the first electric machine is adapted to simultaneously covert rotary speed of the input shaft into electrical energy.

33. The multi-mode transmission of claim 25 wherein the plurality of gear pairs includes a first and second input gears carried by the input shaft and first and second output gears carried by the countershaft, wherein the first and second output gears are coupled to each other to rotate in fixed relation about a common axis.

34. The multi-mode transmission of claim 25 including a clutch assembly positioned in a power flow path between the first energy generation machine and the final drive shaft to selectively disengage the first energy generation machine from the final drive shaft, wherein the first and second energy generation machines are simultaneously drivable by the input shaft to convert power from the prime mover into electrical energy.

* * * * *

UNITED STATES PATENT AND TRADEMARK OFFICE
CERTIFICATE OF CORRECTION

PATENT NO. : 8,523,734 B2  
APPLICATION NO. : 12/613992  
DATED : September 3, 2013  
INVENTOR(S) : Mepham et al.

Page 1 of 1

It is certified that error appears in the above-identified patent and that said Letters Patent is hereby corrected as shown below:

Title Page, Item (57) Abstract, Line 11:

"covert" should be --convert--

In the Claims:

Claim 2, Column 19, Line 22:

"covert" should be --convert--

Claim 9, Column 20, Line 17:

"covert" should be --convert--

Claim 32, Column 24, Line 2:

"covert" should be --convert--

Signed and Sealed this
Nineteenth Day of November, 2013

Teresa Stanek Rea
*Deputy Director of the United States Patent and Trademark Office*